United States Patent
Miller et al.

(10) Patent No.: US 8,721,759 B1
(45) Date of Patent: *May 13, 2014

(54) METHOD AND SYSTEM FOR AGRICULTURAL FERTIGATION

(71) Applicants: John C. Miller, Fresno, CA (US); Deborah L. Miller, Fresno, CA (US)

(72) Inventors: John C. Miller, Fresno, CA (US); Deborah L. Miller, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,648

(22) Filed: Jul. 25, 2013

Related U.S. Application Data

(63) Continuation-in-part of application No. 13/573,987, filed on Oct. 18, 2012, now abandoned, which is a continuation-in-part of application No. 13/136,032, filed on Jul. 21, 2011, now Pat. No. 8,568,506, which is a continuation-in-part of application No. 12/283,448, filed on Sep. 12, 2008, now abandoned.

(60) Provisional application No. 61/056,151, filed on May 27, 2008.

(51) Int. Cl.
*C05C 9/00* (2006.01)
*C05C 5/00* (2006.01)
*C05C 5/04* (2006.01)
*C05C 3/00* (2006.01)
*C05C 11/00* (2006.01)
*C05C 13/00* (2006.01)

(52) U.S. Cl.
USPC ............. 71/28; 71/54; 71/58; 71/59; 71/61

(58) Field of Classification Search
USPC ............. 239/727; 422/129; 71/28, 29, 30, 34, 71/36, 58, 63, 54, 59, 61
See application file for complete search history.

(56) References Cited

U.S. PATENT DOCUMENTS

| | | | | | |
|---|---|---|---|---|---|
| 2,163,065 | A | * | 6/1939 | Rosenstein | 71/1 |
| 2,969,280 | A | * | 1/1961 | Peck | 71/41 |
| 3,888,652 | A | * | 6/1975 | Yie et al. | 71/61 |

* cited by examiner

*Primary Examiner* — Wayne Langel
(74) *Attorney, Agent, or Firm* — Joan I. Norek; The Law Office of Joan I. Norek.

(57) ABSTRACT

An agricultural fertigation method includes the continuous in situ manufacture of one or more nitrogen-nutrient raw fertilizers within the irrigation system upstream of the agricultural field being irrigated for a prolonged term. Raw materials, namely nitric acid, urea, ammonium hydroxide, calcium nitrate and/or magnesium nitrate, are intermixed with each other and/or with the stream of the flowing irrigation water. The stream of flowing irrigation water dampens the resultant dissolution exotherm. A system wherein raw materials are efficiently continuously fed to the irrigation system main line or a side-arm reactor efficiently implements the method.

13 Claims, 4 Drawing Sheets

METHOD AND SYSTEM FOR AGRICULTURAL FERTIGATION

This application is a continuation in part of co-pending application Ser. No. 13/573,987, filed on Oct. 18, 2012, which is a continuation in part of Ser. No. 13/136,032, filed on Jul. 21, 2011, which is a continuation in part of application Ser. No. 12/283,448, filed on Sep. 12, 2008, claiming the domestic priority benefit of application No. 61/056,151 filed on May 27, 2008, inventors Miller et al.

BACKGROUND OF THE INVENTION

The present invention relates to methods for adding fertilizer nutrients, particularly nitrogen, to agricultural irrigation systems, including particularly agricultural micro-irrigation and sprinkler systems.

The agriculture industry adds fertilizers to the plant environs, such as the soil, to enhance crop growth and subsequent yields. Commercial fertilizers are usually selected of a variety of formulations depending on the crop and its nutrient requirements.

Fertilizers generally are classified according to their NPK content. NPK is common terminology used in the fertilizer industry and stands for: (1) N—the amount of nitrogen in the formulation as N; (2) P—the amount of phosphorus in the formulation as $P_2O_5$; and (3) K—the amount of potassium in the formulation as $K_2O$. Nitrogen, phosphorus and potassium are the basic plant nutrients or macronutrients that are taken up and utilized by the growing crops, and that are provided by the addition of fertilizers (NPK fertilizers).

A fertilizer, as that term is used herein and as generally understood, refers to the nutrient-containing materials used to deliver fertilizer nutrients to a crop. Conventional fertilizers typically will contain materials that are extraneous to the crop's nutrient-uptake ("nutrient-extraneous materials") but which, for practical and/or other reasons, are necessary to the delivery of the nutrients. The process of delivering fertilizer nutrients to crops is referred to as fertilization.

The fertilization method of adding fertilizers to the water being used to irrigate the crops is called "fertigation", reflecting this combination of irrigation and fertilization. Fertigation reduces the labor expended in the addition of fertilizers.

To conserve water, which is decreasing in availability and increasing in cost, current conventional technology includes micro-irrigation systems that deliver precise amounts of water directly to the soil holding the root system of the plant that is being grown. In the past twenty to thirty years, a large percentage of crop producers in the western and southwestern United States have converted from flood and sprinkler irrigation systems to micro-irrigation technology. Micro-irrigation systems contain devices called emitters, micro-sprinklers or other such devices that provide the precise amounts of water directly to the desired soil site, namely the soil holding the roots of the plant or crop being irrigated. Upon conversion to micro-irrigation systems, farmers began adding fertilizers through them.

Micro-irrigation systems, unfortunately, are sensitive to water quality and the inclusion of fertilizers and other additives. The sensitivity of micro-irrigation systems to water quality and additives stems from the refinement of the micro components in a micro-irrigation system. These emitters, micro-sprinklers or other micro devices deliver the desired precise amounts of water so long as they do not plug or foul. Plugging occurs when deposits, from any source, build up inside these devices. The smallest particle or foreign material can cause fouling of these devices because these devices have very tiny orifices and/or a long tortuous narrow passageway that provide the requisite pressure for delivery of precise amounts of water in a uniform manner to each plant in the crop being irrigated. Water quality and the inclusion of fertilizers can, and frequently does, cause severe plugging problems. The problems arise from a number of factors: (1) the irrigation water is typically obtained from wells, reservoirs, canals, lakes, or rivers which contain various amounts of dissolved minerals; and (2) fertilizers can form insoluble salts and/or cause particulate formation when added to the water. Macro-irrigation systems mainly tolerate these conditions, while micro-irrigation systems are extremely intolerant.

In more detail, the addition of fertilizers to the micro-irrigation water increases the loading of inorganic salts over that already in the water. When the loading, or the combined loading, is too high, the solubilities of at least some of the naturally-occurring minerals and/or added compounds are exceeded and particulate formation increases dramatically. When particulates form, significant deposits begin to build up throughout the entire micro-irrigation system. The end result is plugging of the emitters or micro-sprinklers.

Plugging results in uneven distribution of water and nutrients to the crop being irrigated. In some cases, complete shut-down of the irrigation system occurs. Therefore problem-free use of additives such as fertilizers in micro-irrigation systems is normally seen only in irrigation systems that use relatively pure water sources.

The conventional agricultural practice is to make intermittent or periodic applications of fertilizers. Such intermittent additions might be a single addition, or a plurality of additions, of large amounts (high concentrations) of fertilizer during a brief time interval each growing season or crop cycle. (The number of applications per growing season or crop cycle usually depends on the crop and/or the type of fertilizer being added.) When the fertilizer-delivery method is fertigation, fertilizers are typically slug fed into the irrigation system as quickly as possible to minimize the labor requirements and ease material handling. Slug feeding of a block (portion of a field) normally entails feeding the large amounts (high concentrations) of fertilizer to the irrigation water over a six to seven hour period during irrigation, and then, after the fertilizer feed is shut off, continuing the irrigation of that block for an additional two to three hours to rinse out all of the fertilizer that is contained inside the irrigation system, insuring that all of the fertilizer intended for the block is in fact delivered to the block. Fertigation reduces equipment, fuel and labor costs in comparison to mechanical delivery of fertilizers to the crop, and thus fertigation achieves a significant overall cost savings.

The cost of commercial fertilizer formulations is, however, itself significant, and commercially viable fertilizer formulations (formulations sufficiently inexpensive for bulk agricultural use) typically include, as mentioned above, nutrient-extraneous materials which do not contribute to plant nutrition, and can even be undesirable components.

The term "micro-irrigation" as used herein and in the claims refers to microsprinklers, drip, and subsurface drip systems.

SUMMARY OF THE INVENTION

The present invention provides a method and/or system for fertigation wherein a nitrogen-nutrient feedstock (nitrogen-containing raw materials or inputs) is charged to an active irrigation system continuously, or substantially continuously, at very low levels, during the entire time, or substantially the entire time, that irrigation water is sufficiently flowing through the irrigation system during a prolonged term via a system that provides a high-dilution environment in the feedstock-component intermixing zone. The present method provides on-site fertilizer formulation from the feedstock as that feedstock is charged to the irrigation system continuously, or substantially continuously, at very low levels, during the entire time, or substantially the entire time, that irrigation water is sufficiently flowing through the irrigation system, for a prolonged term ("prolonged-termed continuous charge" or "prolonged-termed continuous fertigation"), whereby an nitrogen-nutrient feedstock is formulated that has a higher nitrogen-nutrient content (low or minimal nutrient-extraneous material), is flexible as to the type of nitrogen nutrient so as to be readily customized to a crop's nitrogen nutrient needs and/or growing conditions and is drastically less costly because commodity raw materials are used, which are advantages that are not available from conventional commercial fertilizers. The feedstock is comprised of at least one, and preferably a plurality of, nitrogen-containing raw materials (components) that intermix as the feedstock is charged to the irrigation system. In preferred embodiments, the system of the present invention is automatic and subject to variation of the amount and type of raw materials forming the feedstock as desired.

DETAILED DESCRIPTION OF THE INVENTION

Prolonged Term

Figure 1:
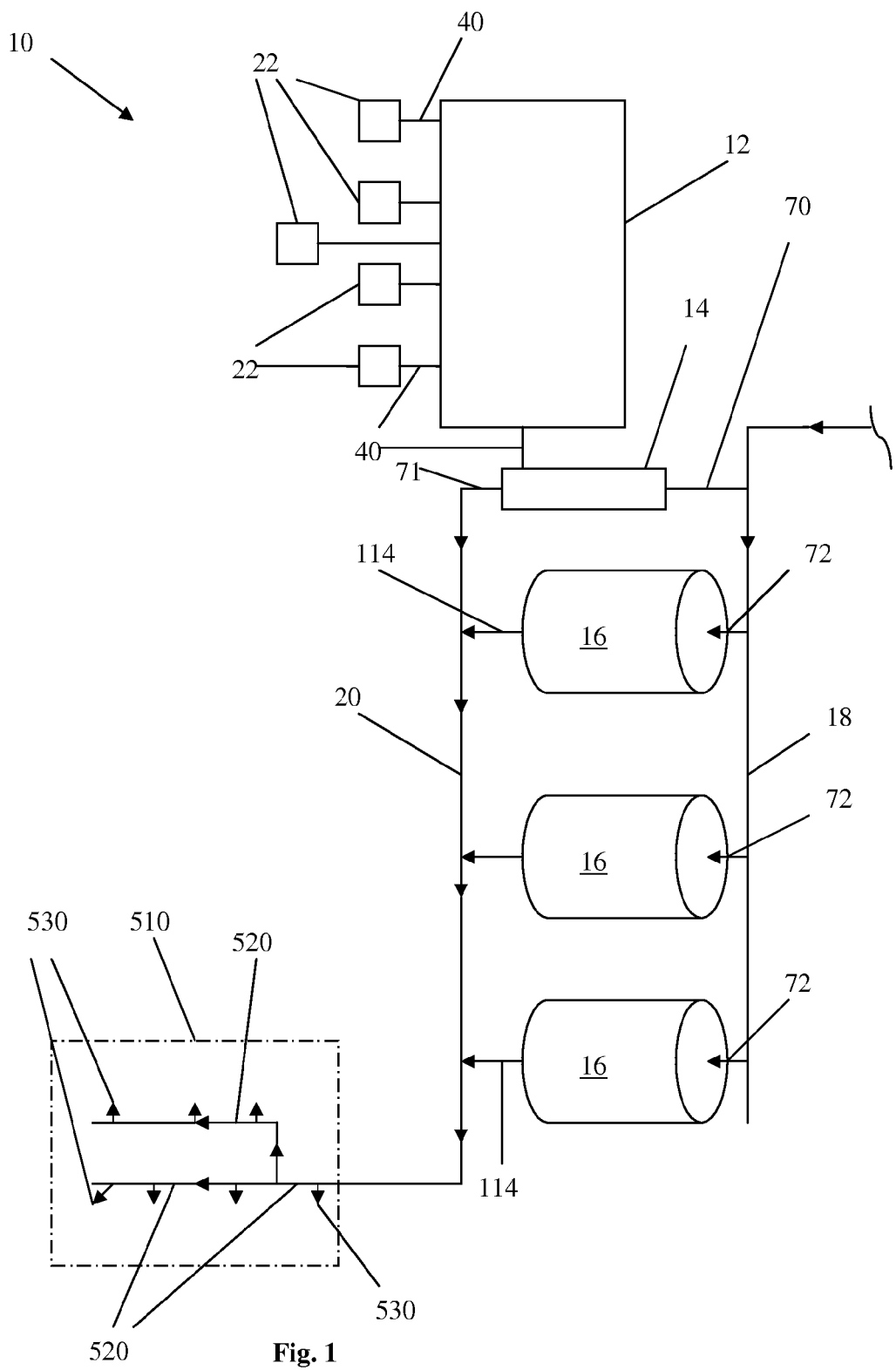
FIG. 1 is an at least partially diagrammatic view of a system of the present invention.

By prolonged term is meant herein a time period that extends from an interval (term) during a crop cycle comprising at least multiple consecutive irrigations, and preferably comprising at least a one month or a time period comprising ten percent of the respective crop cycle, and more preferably at least a two month time period or a time period comprising twenty-five percent of the respective crop cycle, up to an entire crop cycle. (A crop cycle is a crop's growing period, from embryonic to maturity or harvest, during which the crop is irrigated.) Since nitrogen promotes vegetative growth, that is, the development of a crop plant's stems and leaves, when such growth is at, or approaches, optimal, nitrogen fertilization normally should cease to encourage development of the crop's agronomic output (agronomic payload or payout), such as fruit, vegetable, nut and the like sections of the plant, prior to harvest.

On-Site, In-Situ Fertilizer Formulation

The method and/or system of the present invention, namely the method and/or system for fertigation by charging a nitrogen-nutrient feedstock, rather than a commercial fertilizer to the irrigation system, is far more flexible and controlled as to the nitrogen nutrients provided than conventional fertigation practices and such advantages cannot be provided by commercial fertilizers. The other aspect of the method and/or system of the present invention, namely the method and/or system for fertigation wherein nitrogen-nutrient feedstock is charged to the irrigation system continuously or substantially continuously for a prolonged term at very low levels, drastically reduces the labor involved, eliminates fouling and plugging potential, and provides a uniform, consistent level of nutrient availability throughout a crop cycle, in comparison to conventional fertigation techniques.

Depending on the nitrogen-nutrients being added, the present invention typically will reduce the number of undesirable components being added (including but not limited to nutrient-extraneous material) in comparison to the undesirable components that will normally be added with conventional, commercially-available fertilizers. A component is undesirable when it interferes with, or is otherwise detrimental to, the fertigation process, such as a species which lowers the system solubility ceiling, or creates an excess of a nutrient, or is toxic to the crop, or is superfluous or the like.

The in-situ fertilizer formulation method of the present invention generally, in combination with the prolonged termed continuous low level addition of fertilizer method of the present invention, will further reduce the labor and the plugging potential drawbacks of conventional fertigation.

The nitrogen-nutrient feedstock used in the present invention generally is selected from five basic raw materials, namely concentrated nitric acid, urea, calcium nitrate, magnesium nitrate and ammonium hydroxide. These basic raw materials are typically not, or cannot be, currently added to an irrigation system. (The present invention does not exclude the concomitant addition of other materials if desired, including but not limited to acid, such as sulfuric acid, for pH control, one or more other fertilizers and the like.)

Nitric Acid

Concentrated nitric acid is a very corrosive material that necessitates special equipment and safety precautions and its addition creates a risk of (a) corrosion of the metal components of the irrigation system and (b) embrittlement of, and damage to, the sensitive plastic irrigation-system components (emitters and the like) that deliver regulated amounts of water to each plant. Its nitrogen is nitrate nitrogen.

Urea

Urea is a very slow release source of nitrogen that must be broken down within the soil to provide a nitrogen source of the slow-release ammoniacal form.

Calcium Nitrate

Calcium nitrate is a nitrogen source of the rapid-release nitrate form. Its addition under conventional practices increases the calcium level and therefore can lead to calcium carbonate precipitation and irrigation-system plugging.

Magnesium Nitrate

Magnesium nitrate is a nitrogen source of the rapid-release nitrate form. Its addition under conventional practices increases the magnesium level and therefore can lead to magnesium carbonate precipitation and irrigation-system plugging.

Ammonium Hydroxide

Ammonium hydroxide is a nitrogen source of the slow-release ammoniacal form. Ammonium hydroxide is not used in agriculture due to its caustic nature which results in safety and handling problems for the grower. The high alkalinity, in combination with the typical low quality of typical irrigation water, leads to calcium and/or magnesium carbonate precipitation, which plugs the irrigation system. The high alkalinity also conventionally leads to soil "hardpanning" (forming a rock-hard barrier that water cannot penetrate) upon interaction with the soil. In the practice of the method of the present method, ammonia gas (ammonia as a 95 to 100 wt. percent gas) dissolved in water on-site to produce ammonium hydroxide can be used, including using ammonia gas as the ammonium hydroxide nitrogen-nutrient-feedstock raw material whereby ammonium hydroxide is formed within the irrigation water of the irrigation system.

Nitrate nitrogen is immediately absorbed and utilized by a plant and therefore is considered a fast release source of nitrogen. Ammonia (ammonic or ammoniacal nitrogen) is considered a slow-release form of nitrogen because it first must be oxidized or fixed in the soil to form nitrate, which can then be used by the plant. Urea must be hydrolyzed in the soil to form ammonia and carbon dioxide and then fixed to form nitrate, before it can be used by the plant and is considered a very slow or controlled release form of nitrogen.

For agronomic reasons a mixture or blend of nitrate and ammoniacal nitrogen is usually desirable. The most common commercial nitrogen-source fertilizer blend is called UAN-32. (UAN is an acronym for an aqueous solution of urea and ammonium nitrate.) UAN-32 is a blend of ammonium nitrate and urea (sometimes referred to as "urea ammonium nitrate"), which contains 32.0% nitrogen (as N), namely 7.75% ammoniacal nitrogen (slow release nitrogen), 7.75% nitrate nitrogen (fast release nitrogen), and 16.5% urea nitrogen (very slow release nitrogen). A common commercial alternative to an UAN-32 blend is AN-20, an ammonium nitrate solution. (AN is an acronym for an aqueous solution of ammonium nitrate.) In either case, these commercial products are supplied as very dilute solutions (which creates high shipping costs) and are expensive.

Conventional Fertigation Methods and the Plugging-Potential Drawback

In conventional fertigation methods, the slug feeding of various fertilizer formulations can cause substantial plugging of the irrigation system. This type of plugging occurs when impurities contained in the irrigation water interact with the fertilizer being slug fed. The solubility of one or more components of fertilizer and one or more of the impurities of the irrigation water is exceeded and one or more insoluble salts are formed and precipitate. This precipitate then plugs the various parts of the irrigation system, particularly the emitters and/or micro-sprinklers.

In more detail, most naturally-occurring waters contain dissolved minerals that can lead to plugging in micro-irrigation systems. Irrigation water contains constituents such as calcium, magnesium, alkalinity, iron, manganese, sulfates, and sulfide that can precipitate to clog emitter flow, causing plugging. Calcium or magnesium concentrations exceeding 2-3 meq/liter (100-150 ppm as $CaCO_3$) can cause precipitates to form. The Solubility Chart below provides an overview of inorganic anion/cation incompatibilities, that is, anions and cations that, when both are present, lead to insoluble inorganic salt formation that can cause plugging in micro-irrigation systems.

Chart 1
Solubility Chart For Common Irrigation-Systems Anions And Cations Anion

| Cation | $Cl^-$ | $HCO_3^-$ | $OH^-$ | $NO_3^-$ | $CO_3^{-2}$ | $SO_4^{-2}$ | $S^{-2}$ | $PO_4^{-3}$ |
|---|---|---|---|---|---|---|---|---|
| $Na^+$ | S | S | S | S | S | S | S | S |
| $K^+$ | S | S | S | S | S | S | S | S |
| $NH_4^+$ | S | S | S | S | S | S | S | S |
| $H^+$ | S | $CO_2$ | $H_2O$ | S | $CO_2$ | S | $H_2S$ | S |
| $Ca^{+2}$ | S | SS | VSS | S | I | VSS | XXX | I |
| $Mg^{+2}$ | S | S | I | S | VSS | S | XXX | I |
| $Fe^{+2}$ | S | SS | VSS | S | VSS | S | I | I |
| $Fe^{+3}$ | S | I | I | S | I | S | XXX | I |
| $Mn^{+2}$ | S | XXX | I | S | I | S | I | I |

In Chart 1, S means soluble (over 5,000 ppm), SS means slightly soluble (2,000 to 5,000 ppm), VSS means very slightly soluble (20-2,000 ppm), I means insoluble (<20 ppm) and XXX means does not form (is not a compound). From Kemmer, Frank N., *Water: The Universal Solvent*, Basic Chemistry, p. 37, Nalco Chemical Company 1977.

Conventional Fertigation Methods and the Unbalanced Nutrient Availability Drawback As discussed above, the conventional method of fertilizer addition, by conventional fertigation or mechanical means, involves adding the fertilizer about once or twice a growing season or crop cycle because of the logistics and labor that are required. When the fertilizer is accordingly slug fed to the field, it is typically fed at a very high rate over a short period of time, whereby a high concentration of fertilizer is added to the root zone of the crop. This high concentration of fertilizer is greater than the plant can absorb, and therefore it is not completely absorbed (which is why a portion of it is considered one of the "nutrient-extraneous materials"). Some of the residual fertilizer, which typically is a high fertilizer residual, interacts with the soil. These fertilizer-soil interactions normally result in the formation of insoluble inorganic salts, with a concomitant and substantially irreversible loss of available fertilizer. Further, each subsequent irrigation drives or washes available residual fertilizer away from the wetted root zone core towards the perimeter of the wetted zone, mechanically diminishing its availability to the plant. Eventually, the fertilizer concentration gradient which is created results in very little fertilizer being available within the wetted root zone. The level of available residual fertilizer in the wetted root zone will typically drop to essentially zero for a time period ahead of the next fertigation. For these reasons, conventional fertigation practices lead to huge swings in the amount of fertilizer that is available to the plant over time. These swings in available fertilizer in turn lead to costly compensations in the form of increased fertilizer feeds. In other words, the amount of fertilizer that is considered required is increased because a significant portion of the residual fertilizer becomes unavailable to the plant.

The Basics of the Present Fertigation Method and System

The nitrogen-nutrient feedstock is charged to an irrigation system by either (1) concomitantly feeding its components (raw materials) to a water stream (preferably a stream of irrigation water) flowing through a mixing chamber that discharges to a main line of an irrigation system downstream of any irrigation-system filters and upstream of the delivery points of the irrigation system, or (2) concomitantly feeding its components (raw materials) directly to a main line of an irrigation system downstream of any irrigation-system filters and upstream of the delivery points of the irrigation system. The intermixing of components therefore is initiated either in a mixing chamber upstream of the irrigation system's main line or within the main line itself.

The present method and system of the present invention preferably employ an automated feed system which simultaneously feeds or charges at least one, and preferably a plurality of, raw materials to the mixing chamber or main line at a pre-selected or pre-determined rate. Such an automated feed system therefore charges a nitrogen-nutrient feedstock of a pre-selected or pre-determined composition at a pre-selected or pre-determined rate. The automatic feeding of the nitrogen-nutrient feedstock at a pre-selected or pre-determined rate is particularly important when it is desirable to feed the feedstock at a rate relative to the irrigation-water flow rate, so as to automatically provide and maintain a pre-selected or pre-determined concentration of each nitrogen-nutrient raw material in the irrigation water throughout the fertigation period, including when the irrigation water flow rate varies from one set to the next. Such an automated feed system would be inactive or idle when there is no irrigation water flow in the irrigation line served by the automated feed system. That automated feed system may be, and in certain embodiments is preferably, automatically activated or triggered upon the commencement of water flow in the irrigation line, and may be, and in certain embodiments is preferably, automatically deactivated or halted when the flow of irrigation water ceases.

The charge of the nitrogen-nutrient feedstock to the irrigation water is at a very low level feed so as to restrict or confine nitrogen-nutrient-feedstock concentration in the irrigation water to extremely low levels at all times. The charge of the nitrogen-nutrient feedstock to the irrigation water is prolonged-termed continuous. By a prolonged-termed (or prolonged-term) continuous charge of nitrogen-nutrient feedstock (or continuously charging nitrogen-nutrient feedstock over a prolonged term) is meant herein that the charge is continuous when irrigation water is sufficiently flowing to dampen the dissolution exotherms that result from the charge, or in other words, continuous when the irrigation system is active, for a term of from at least multiple consecutive irrigation days up to all of the irrigation days of an entire crop cycle. In more detail, when an irrigation system is idled, water usually drains out and the system becomes mainly filled with air. Upon reactivation, there is a time delay between the start of water flowing into the irrigation system and the point of time at which the system reaches its full or normal operating pressure (from about 10 to 150 psi depending on the system). The prolonged-termed continuous charge of nitrogen-nutrient feedstock ceases when the shut down (the idling) of the irrigation system initiates (and the water pressure falls below full or normal operating pressure for the given system) and does not recommence on the subsequent irrigation day until at least a preponderance of the irrigation system is refilled with water, at which point the system is typically approaching but might not yet be at its full or normal operating pressure. The water-flow characteristics required to dampen the dissolution exotherms can be calculated using simple thermodynamics for any given irrigation system. An alternative determinant is ninety percent of full or normal operating pressure, or in other words, by a prolonged-termed continuous charge of nitrogen-nutrient feedstock is meant herein that the charge is continuous (although it can vary as to selection of raw materials) throughout a prolonged term when irrigation water is flowing at least at ninety percent of full or normal operating pressure.

The Present Fertigation Method and Alleviation of the Plugging-Potential Drawback Plugging of the irrigation system due to the additional loading of cations and anions, leading to the formation and precipitation of insoluble salts, is eliminated by the method and system of the present invention because the charge of the nitrogen-nutrient feedstock at very low levels keeps such precipitates from forming. In other words, the charge of nitrogen-nutrient feedstock in the method and system of the present invention is at a rate that provides a component concentration in the irrigation water below the concentration which would trigger precipitate formation. Solubilities are not exceeded even despite low irrigation water quality.

The Present Fertigation Method and Alleviation of the Unbalanced Nutrient Availability Drawback In contrast to huge swings in available fertilizer when the fertilizer is slug fed about once or twice during a crop cycle, in the present method the nitrogen-nutrient feedstock is added continuously at a very low level. Therefore the level of available fertilizer in the wetted root zone will remain substantially uniform over the entire crop cycle. There will be no swings in the amount of fertilizer that is available to the plant over time. There will be no lost-fertilizer compensations in the form of increased fertilizer feeds. The amount of fertilizer that is considered required is not increased because, in the method and system of the present invention, essentially little or no fertilizer becomes unavailable to the plant.

Long-Felt Need

The present invention is believed to fulfill a long-standing and long-felt need of the agricultural industry and is expected to garner great commercial success attributable to such fulfillment. Further, as seen from the above list of raw materials of the nitrogen-nutrient feedstock, among the raw materials is a strong acid, namely nitric acid, and this preferably will be used in the present invention in concentrated form. Also among the raw materials is a strong base, namely ammonium hydroxide (ammonia), and this preferably will be used in the present invention in concentrated form. These and other nitrogen-nutrient raw materials possess far too large of a heat of dissolution or heat of reaction for use in conventional fertigation.

Figure 2:
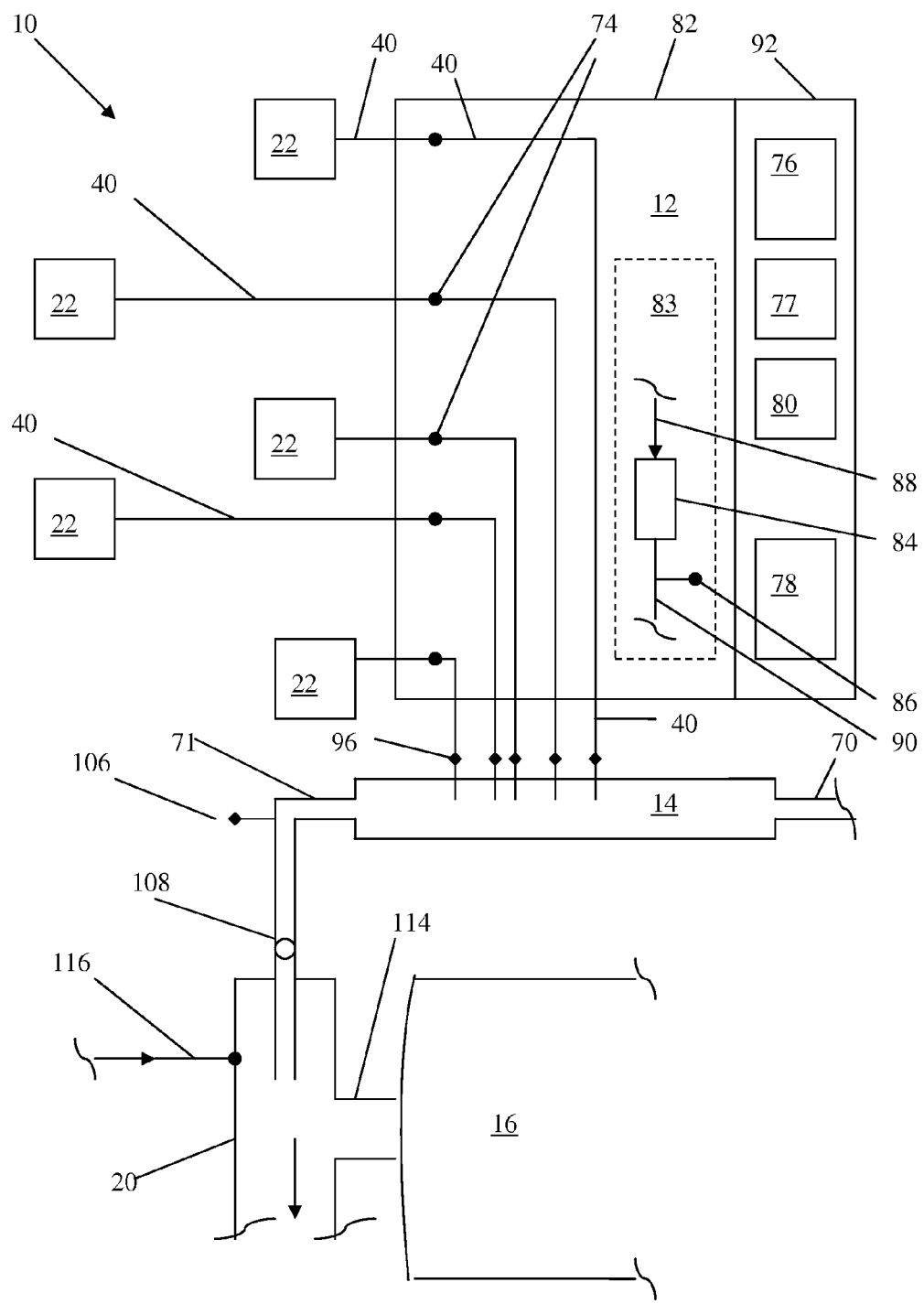
FIG. 2 is an at least partially diagrammatic view of a section of the system of FIG. 1.
Figure 3:
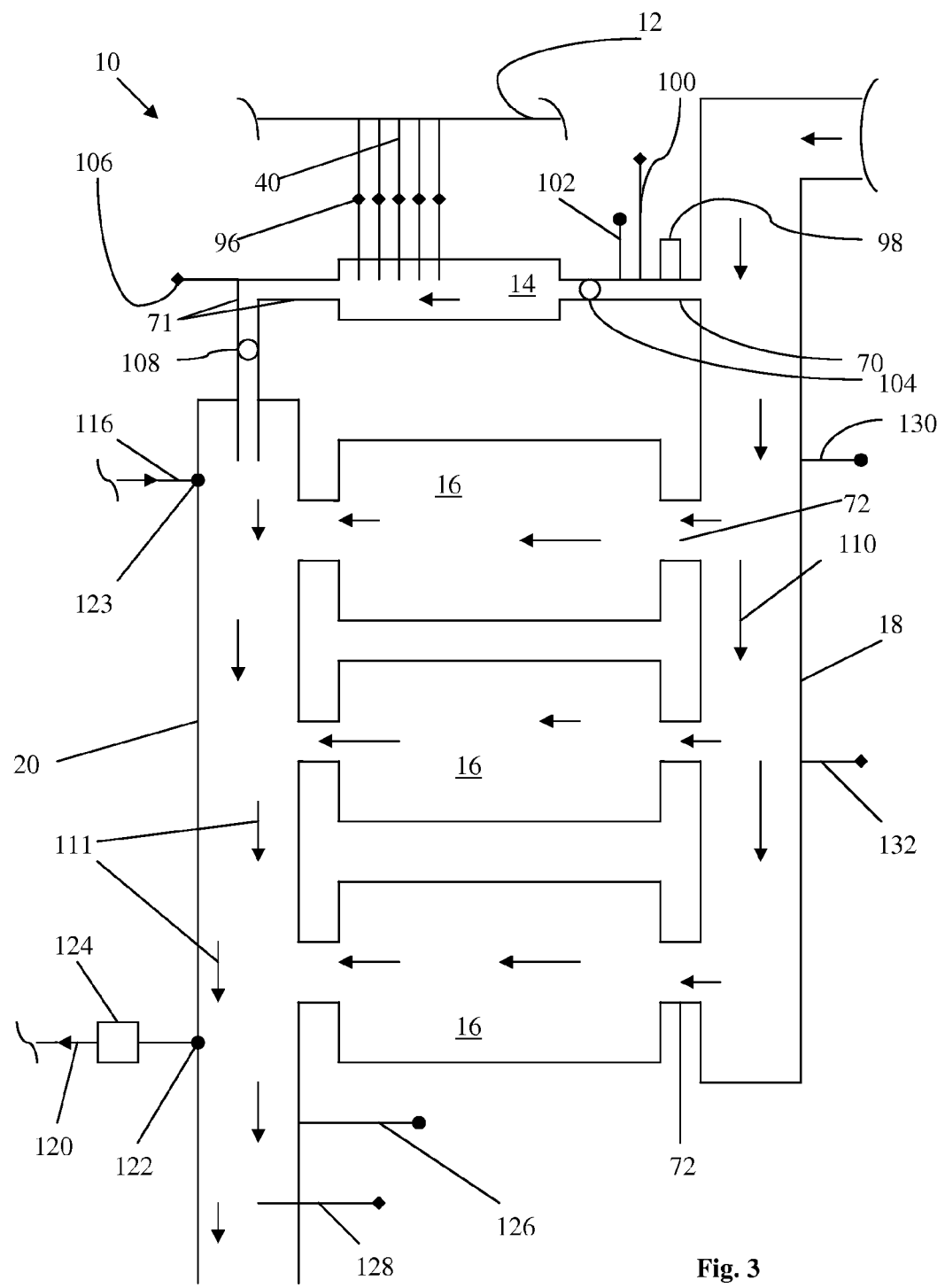
FIG. 3 is an at least partially diagrammatic view of a section of the system of FIG. 1.

The System of FIG. 1 to FIG. 3

Referring to FIG. 1 and, to the extent components are shown in FIG. 2 and FIG. 3, to FIG. 2 and FIG. 3 also, there is shown a system of the present invention designated by the general reference numeral 10. An agricultural irrigation system distributes irrigation water typically from a water source whether it be a well, surface water (such as water in a canal, reservoir, stream or the like), reclaimed or recycled water. A stream of irrigation water is pumped into a main line (irrigation system main line) and then is filtered. The system 10, as shown in FIG. 1, FIG. 2 and FIG. 3, is an embodiment of an extended system of the present invention because system 10 includes such filters and a segment of such a main line from a point upstream of the filters to a point downstream of the filters, and the addition of nitrogen-nutrient feedstock raw materials occurs between these two points.

As described below, a segment of a stream of irrigation water that is running between the irrigation-water source and the irrigation line(s) in the field(s) is within the system 10 wherein the irrigation water is first filtered and then treated with the feedstock of the present invention. The system 10 includes a control unit 12, optionally a plurality of filters, which here are shown as sand-media filters 16, an irrigation-water line, which here is shown as a pre-filter (and somewhat higher pressure) segment of an irrigation-water main line, or pre-filter main line 18, which feeds irrigation water (identified and discussed below) through each of the sand-media filters 16, and also through a mixing chamber 14, to a post-filter (and somewhat lower pressure) segment of the irrigation-water main line, or post-filter main line 20. (The post-filter main line 20 is a transport pipe that carries irrigation water to one or more agricultural fields, such as the agricultural field 510 shown in phantom, and obviously not to scale, in FIG. 1. One or more secondary transport pipes service a typical agricultural field, such as transport pipes 520 shown in FIG. 1. Devices for delivering the irrigation water at points in the field, shown as devices 530 in FIG. 1, can be overhead sprinklers or micro-devices (such as emitters or micro-sprinklers.) The feedstock raw materials are stored in separate storage containers 22 which may be conveniently disposed nearby the control unit 12 as shown. As shown, such storage containers or tanks 22 include one for each of the five basic raw materials. (The storage tanks 22 are shown staggered for simplicity in showing each of the raw material feed lines 40.)

The present invention, however, does not exclude the use of fewer than all five basic raw materials because there are growers who need and/or desire fewer than all. The present invention instead uses at least at least one, and preferably a plurality of, the five basic raw materials.

There is a raw-material feed line 40 between each of the raw-material tanks 22 and the mixing chamber 14. These raw-material feed lines 40 run through the interior of the control unit 12 (not shown in FIG. 1) to the mixing chamber 14. (Only one of such raw-material feed lines 40 is shown running to the mixing chamber 14 for simplicity). For each of the raw materials, and raw-material feed lines 40, which for system 10 is five basic raw materials and five basic raw-material feed lines 40, there is an injection valve 96 along the raw-material feed line 40 just ahead of the point at which the feed line 40 enters the mixing chamber 14, none of which is shown in FIG. 1 for simplicity, and all five of which are shown in FIG. 2 and FIG. 3.

Irrigation water flows to and through each of the sand-media filters 16 through filter feed lines 72. A stream of the irrigation water also flows from the pre-filter main line 18 to the mixing chamber 14 through a mixing-chamber feed line 70, except when the mixing-chamber feed line 70 is closed off. The water flows from the mixing chamber 14 and from each of the sand-media filters 16 discharge to the post-filter main line 20.

Referring now in particular to FIG. 2 (where the storage tanks 22 are again shown staggered for simplicity in showing each of the raw material feed lines 40), each of the raw-material feed lines 40 is equipped with a feed pump 74. Each of these feed pumps 74 is controlled by a flow controller 76 and a master controller 78. Each of these feed pumps 74 is in electrical communication with a flow controller 76 and the master controller 78 (the electrical connections are not shown) and injects or pumps in its respective raw material to its respective feed line 40 at the rate determined by the flow controller 76 and the master controller 78.

The control unit 12 is divided into two chambers, one of which is a lower chamber 82 which houses the feed pumps 74 and a portion of the raw material feed lines 40 downstream of the respective tanks 22 and upstream of the mixing chamber 14. The second chamber of the control unit 12 is an upper chamber 92 which houses the flow controller 76, the master controller 78 and an optional temperature controller 77.

Along each of the raw material feed lines 40 downstream of the respective feed pumps 74 and upstream of the mixing chamber 14 is, as mentioned above, an injection valve 96, each of which is preferably equipped with a backflow preventer (not shown). Along the mixing-chamber feed line 70 are, in the order of from upstream (closest to the pre-filter main line 18) to downstream (closest to the mixing chamber 14) an optional booster pump 98, a mixing-chamber feed-line flow meter 100, a mixing-chamber feed-line flow sensor 102 and a mixing-chamber feed-line shut-off valve 104. The line opposite the mixing-chamber feed line 70 is a mixing-chamber discharge line 71 that is open to the post-filter main line 20. Along the mixing-chamber discharge line 71, in the order of from upstream (closest to the mixing chamber 14) to downstream (closest to the post-filter main line 20), are an optional mixing-chamber discharge-line thermocouple 106 and a mixing-chamber discharge-line shut-off valve 108.

The pre-filter main line 18 is open to the mixing chamber 14 through the mixing-chamber feed line 70, and is open to each of the sand-media filters 16 through filter feed lines 72 or openings. Untreated irrigation water, that is, irrigation water that is not yet treated by the system of the present invention, which is shown by flow arrows and is designated as untreated irrigation water 110 in FIG. 3, flows through the pre-filter main line 18 and discharges to the mixing chamber 14 and the sand-media filters 16 through these respective lines.

As noted above, the mixing-chamber discharge line 71 is open to, and discharges to, the post-filter main line 20, which is best seen in FIG. 3. In addition, each of the sand-media filters 16 is open to, and discharges to, the post-filter main line 20 via filter discharge lines 114 or openings. The untreated irrigation water 110 of the pre-filter main line 18 thus flows to the post-filter main line 20 and therein receives the discharge from the mixing-chamber discharge line 71, becoming irrigation water that carries or has been treated with the nitrogen-nutrient feedstock of the present invention. Such treated irrigation water is shown by flow arrows and is designated as treated irrigation water 111 in FIG. 3 and elsewhere herein.

Along the post-filter main line 20, in the order of from upstream (closest to the mixing-chamber discharge line 71) to downstream (farthest from the mixing-chamber discharge line 71), are a post-filter main-line pressure gauge 126 and a post-filter main-line flow sensor 128.

Along the pre-filter main line 18, in the order of from upstream (closest to the mixing-chamber feed line 70) to downstream (farthest from the mixing-chamber feed line 70), are a pre-filter main-line pressure sensor 130 and a pre-filter main-line pressure gauge 132.

The storage tanks 22 can vary in size depending on the size and nutrient needs of the irrigation site they serve. Typical storage container sizes are between 300 and 6,500 gallons. The electrical connections between the feed pumps 74 along the raw-material feed lines 40 and the controlling flow controller 76 and master controller 78 each consist separately of an on/off power control (not shown) and a feedback loop (not shown) which controls the output of the respective feed pumps 74, and the construction and operation of such electrical connections are well within the skill of an ordinary person skilled in the art. The upper chamber 92 of the control unit 12, which houses the electrical controls, namely the flow controller 76, the temperature controller 77 and the master controller 78, is isolated from the lower chamber 82 (which houses the feed pumps 74) to avoid, or at least inhibit, corrosion of the electrical components of the electrical controls. The control unit 12 generally is preferably constructed of heavy gauge steel that is anodized to inhibit corrosion. It preferably is secured with a high security lock system (not shown) and is preferably anchored to the ground with several six foot deep spikes (not shown) to prevent tampering and/or theft of the equipment held within the control unit 12.

The flow controller 76 within the control unit 12, which is one of the controls over the feed pumps 74, is also in electrical connection (not shown) with the post-filter main-line flow sensor 128 along the post-filter main line 20. (The construction and operation of these electrical connections are well within the skill of an ordinary person skilled in the art.) The flow controller 76 proportionately varies the input of the raw materials through the respective feed pumps 74 based on the flow rate of the treated irrigation water 111 which is read by the post-filter main-line flow sensor 128 downstream of (beyond) the sand-media filters 16.

The temperature controller 77 within the control unit 12 is in electrical connection (not shown) with the mixing-chamber discharge-line thermocouple 106 along the mixing-chamber discharge-line 71. (The construction and operation of these electrical connections are well within the skill of an ordinary person skilled in the art.) The raw materials from the various storage tanks 22 are routed through the respective raw material feed lines 40 and charged to the mixing chamber 14 as the nitrogen-nutrient feedstock of the present invention. The components of the nitrogen-nutrient feedstock are intermixed with each other and a stream of untreated irrigation water 110 being fed into the mixing chamber 14 through the mixing-chamber feed line 70. Upon such intermixing, there is an exotherm from the heat of dissolution. The exotherm is the reason the temperature of the nitrogen-nutrient feedstock and irrigation water mixture is preferably monitored by the mixing-chamber discharge-line thermocouple 106 as the nitrogen-nutrient feedstock exits the mixing chamber 14. If that temperature is undesirably high, for instance 40° C. or higher (higher than 39° C.), the temperature controller 77 sends a feedback signal to the master controller 78 and the master controller 78 shuts off the feed pumps 74 until a safe temperature is seen at the mixing-chamber discharge-line thermocouple 106, and this off/on sequence is repeated until a safe temperature, as seen at the mixing-chamber discharge-line thermocouple 106, is maintained.

The master controller 78 automatically turns the system 10 on. The master controller 78 is electrically connected (not shown) both to the pre-filter main-line pressure sensor 130 and to the mixing-chamber feed-line flow sensor 102. (The construction and operation of these electrical connections are well within the skill of an ordinary person skilled in the art.) When a minimum pressure (typically 15 psi) is seen at the pre-filter main-line pressure sensor 130 and a minimum flow of water (typically twenty gallons per minute) is seen at the mixing-chamber feed-line flow sensor 102, the master controller 78 actuates the feed pumps 74 and injection valves 96 and any other component of the system 10 which facilitate the treatment of the untreated irrigation water that are then in an inactive state. Upon such actuation, raw materials start feeding to, and mixing in, the mixing chamber 14 (The master controller 78, pre-filter main-line pressure sensor 130 and mixing-chamber feed-line flow sensor 102 are typically always in an active state). The master controller 78 will not allow such actuation unless both minimums are met. Once the feed pumps 74 and injection valves 96 are actuated, the master controller 78, for safety reasons and preferably, will automatically shut down the feed pumps 74 and injection valves 96 when either of the values seen at the pre-filter main-line pressure sensor 130 and the mixing-chamber feed-line flow sensor 102 falls below its respective minimum, and automatically restart the feed pumps 74 and injection valves 96 when both of the values seen at the pre-filter main-line pressure sensor 130 and the mixing-chamber feed-line flow sensor 102 meet or exceed its respective minimum. In other words, once the flow of untreated irrigation water 110 to the fields begins, it starts flowing (a) through the pre-filter main line 18, (b) to and through the sand-media filters 16, (c) discharging to, and flowing through the post-filter main line 20, and (d) from there to the irrigation lines in the field(s) (not shown), the master controller 78 will actuate the feed pumps 74 and injection valves 96 if the irrigation water is at the normal or expected pressure, flow and flow rate. Note that generally the flow of irrigation will occur as described above regardless of whether the master controller 78 has actuated the feed pumps 74 and injection valves 96 or has shut down the feed pumps 74 and injection valves 96 after initial actuation because that flow sequence and infrastructure are the conventional elements of the irrigation system.

Based on the nutrient-application profile (the type and amount of nutrients that are required for a given time period of the given crop cycle), the master controller 78 automatically determines and sets the correct synchronizations of the feed pumps 74 to provide the desired feedstock raw materials.

As mentioned elsewhere herein, the master controller 78 controls the temperature within the mixing chamber 14, preventing the temperature from straying out of (normally exceeding) the desired range, by shutting off the feed pumps 74 until that temperature drops to, and can be maintained within, the desired range.

When filter(s) are disposed within the path of the irrigation water flowing through the system of the present invention (which is standard but not universal for commercial irrigation systems), such as the sand-media filters 16 shown within the path of the irrigation water between the pre-filter main line 18 and post-filter main line 20 (except the small stream of irrigation water that is routed through the mixing chamber 14), there is normally a small but significant water-flow pressure drop across the filters, such as sand-media filters 16. A flow rate of at least 20 gallons per minute or more of untreated irrigation water 110 through the mixing chamber 14 is preferred, and the optional booster pump 98 is preferably included to provide such flow rate if the pressure drop across the sand-media filters 16 would result in a lower flow rate through the mixing chamber 14 or if a higher flow rate is required to maintain a mixing chamber temperature below 40 degrees C.

As noted elsewhere, disposed along the mixing-chamber feed line 70 are the booster pump 98, the mixing-chamber feed-line flow meter 100, the mixing-chamber feed-line flow sensor 102 and the mixing-chamber feed-line shut-off valve 104. The mixing-chamber feed-line flow meter 100 determines the actual flow rate of untreated irrigation water 110 to, and therefore through, the mixing chamber 14. The mixing-chamber feed-line flow sensor 102 determines if a flow of untreated irrigation water 110 is occurring to, and therefore through, the mixing chamber 14. The flow of raw materials to the mixing chamber 14 will not be permitted unless a flow of untreated irrigation water 110 is occurring through the mixing chamber 14. There of course are electrical connections (not shown) between the mixing-chamber feed-line flow meter 100 and the master controller 78, and between the mixing-chamber feed-line flow sensor 102 and the master controller 78.

The mixing-chamber feed-line shut-off valve 104 is not generally an active element in the operation of the present system, but instead it is an optional, and typically manual, expedient. The mixing-chamber feed-line shut-off valve 104 and the mixing-chamber discharge-line shut-off valve 108 (which likewise is an optional, and typically manual, expedient) can be conveniently used together to isolate the mixing chamber 14 from the flows of irrigation water for maintenance or repair purposes, if ever needed. When the mixing-chamber feed-line shut-off valve 104 and the mixing-chamber discharge-line shut-off valve 108 are open (or in embodiments when they are not present), the small stream of untreated irrigation water 110 flows through the mixing chamber 14 whenever the irrigation water is flowing to the fields (not shown), regardless of whether or not any raw materials are being fed to the mixing chamber 14.

Along the mixing-chamber discharge line 71, downstream of the mixing chamber 14, are the mixing-chamber discharge-line thermocouple 106 which senses the temperature of the nitrogen-nutrient feedstock and irrigation water mixture as it exits the mixing chamber 14, and sends that data signal (temperature reading) to the master controller 78 for its processing and control of the temperature within the mixing chamber 14 as discussed elsewhere herein. There of course are electrical connections (not shown) between the mixing-chamber discharge-line thermocouple 106 and the master controller 78.

The dispositions and functions of the post-filter main-line pressure gauge 126, pre-filter main-line pressure gauge 130 and the post-filter main-line flow sensor 128 are discussed elsewhere.

The sand-media filters 16 are typically large, for instance 300 gallon, stainless steel filters. Such type of filters is routinely used by growers to remove debris from untreated irrigation water before it enters the irrigation system in the fields. The sand-media filters 16 of the system 10 of the present invention generally and preferably would be filters that are already in place at the given irrigation-system site. As the untreated irrigation water 110 passes through the sand of the sand-media filters 16, the flow of the untreated irrigation water 110 is restricted and that flow restriction causes a small but significant pressure drop across the sand-media filters 16. Such pressure drop is typically in the range of from 5 to 15 psi (but can be higher as debris builds up in the filter), and is the reason that there is a pressure differential between the pre-filter main line 18 and the post-filter main line 20. This pressure drop facilitates a large (fast) flow of untreated irrigation water 110 through the mixing chamber 14 that is needed to temper or mitigate the temperature increase stemming from the exotherms within the mixing chamber 14. (As mentioned elsewhere, if the temperature of the water flowing out the mixing chamber 14 is too high, the charging of nitrogen-nutrient feedstock to the mixing chamber 14 is halted.) The previously-described optional booster pump 98 is available to create and/or maintain the requisite water flow through the mixing chamber 14, and it is a highly recommended option for irrigation systems that do not have a large enough pressure drop across the filters 16 to provide the requisite cooling by the untreated irrigation water 110 when the nitrogen-nutrient feedstock is charged to the mixing chamber 14.

In other words, the flow of untreated irrigation water 110 water through the mixing chamber 14 is large (fast) compared to the feed rate (injection rate) of the raw materials into the mixing chamber 14, and thereby quenches any exotherm(s) caused by the charging of nitrogen-nutrient feedstock to the mixing chamber 14.

The level of nitrogen-nutrient feedstock that can be charged to the mixing chamber 14 depends on the size of the mixing chamber 14. For any given level, the mixing chamber 14 and the stream of water flowing through it must be sufficiently large to dampen and mitigate the exotherms generated.

In contrast, the system shown in FIG. 4 and described below charges the nitrogen-nutrient feedstock directly into the irrigation main line, and therefore it intrinsically has a sufficient water flow to dampen and mitigate exotherms generated regardless of the level of nitrogen-nutrient feedstock charged. (Any level of nitrogen-nutrient feedstock that might raise exotherm concerns would be far to high for any reasonable purpose.)

Master controller 78 includes various electronic components that are designed to monitor various electrical signals from the sensing devices. Depending on what signals are input, the master controller 78 turns on the various components of the system once the irrigation system is fully operational and in a mode to insure the proper feed of all the raw materials in the correct proportions, under controlled conditions, to safely produce the nitrogen-nutrient feedstock inside the irrigation system. Numerous configurations of electric components could be designed to achieve this control. As shown, the master controller 78 consists of various relays, timing devices and power supplies that take the various signals from the sensing equipment and turn on and off the various control systems to safely control the chemical feed pumps 74. (A master controller could of course send the sensing and control data, via wireless communication networks, to an operator stationed in a distant office.) If any incorrect or out-of-range signal is received by the master controller 78 the circuitry inside the master controller 78 responds and sends the appropriate feedback signal to the appropriate device or system to immediately correct the out-of-range condition, change the flow rate of one or more of the raw material feed pumps 74 or totally shut off one or more of the raw material feed pumps 74.

The system 10 may optionally adjust the pH of the treated irrigation water 111, particularly as illustrated in FIG. 2 and FIG. 3 in which the lower chamber 82 as shown also houses a pH monitoring system 83 (shown in phantom lines in FIG. 2) which, as shown, is comprised of a pH monitoring-system pump 84, a pH sensor 86, a pH feed line 88 and a pH return line 90, and in which the upper chamber 92 includes a pH controller 80. Also along the post-filter main line 20, in the order of from upstream (closest to the mixing-chamber discharge line 71) to downstream (farthest from the mixing-chamber discharge line 71), are the terminal end 116 of the pH return line 90, the starting end 120 of the pH feed line 88 (along which is a pH line shut-off valve 122 and a solenoid 124). The pH control additives, for instance an acid such as sulfuric acid or phosphoric acid (possibly also potassium hydroxide to raise pH) are preferably stored as concentrated solutions in a storage container(s) served by a feed pump(s) and a feed line(s) as discussed above and illustrated for the raw materials.

When this optional feature is present, the pH controller 80, which is in electrical connection (not shown) with the flow controller 76, might override the flow controller 76 at times for the specific control of the feed pump(s) (such as one of the feed pumps 74 shown) along the feed line (such as one of the feed lines 40 shown) of the sulfuric acid (or other pH-control additive) tank (such as one of the tanks 22 shown) to give the target pH. (The construction and operation of these electrical connections are well within the skill of an ordinary person skilled in the art.)

The pH controller 80 is electrically connected (not shown) to the pH monitoring system 83. (The construction and operation of these electrical connections are well within the skill of an ordinary person skilled in the art.) The pH controller 80 in conjunction with the pH monitoring system 83 controls the pH of the treated irrigation water 111 as it leaves the system 10. The pH of the treated irrigation water 111 is monitored by diverting a very small stream of treated irrigation water 111 through the starting end 120 of the pH feed line 88 (see FIG. 3) to the pH sensor 86 (see FIG. 2) whereat the pH of that small stream is determined. Based on the pH of the treated irrigation water 111 and based on the feed being produced in the mixing chamber 14, the pH controller 80 adjusts (increases or decreases) the feed of one or more pH adjustment additives to achieve a target treated irrigation water pH. (Under the present invention, a base is optionally available for increasing the pH if needed to achieve a constant target pH, although in practice a pH increase would normally not be required. Further discussion herein of pH adjustment presumes that decreasing the pH is the only adjustment required.) The target treated irrigation water pH is typically a pH of about 6.5, or between 6.5 and 7, and usually is lower than the pH of the untreated irrigation water, because untreated irrigation water is usually alkaline.

The solenoid 124 allows the small stream of the treated irrigation water 111 to be diverted to the pH monitoring system 83 via the pH feed line 88. The master controller 78 will normally and preferably activate the solenoid 124 when it actuates the feed pumps 74 and injection valves 96. The electrical connections between the solenoid 124 and the master controller 78 are not shown.

As mentioned above, a small stream of treated irrigation water 111 is diverted from the post-filter main line 20 to the pH monitoring system 83 through the pH feed line 88 and is returned to the post-filter main line 20 (preferably, as shown, upstream of its diversion point) through the pH return line 90. Along the starting end 120 of the pH feed line 88 is a pH feed-line shut-off valve 122. Along the terminal end 120 of the pH return line 90 is a pH return-line shut-off valve 123. The pH feed-line shut-off valve 122 and the pH return-line shut-off valve 123 are not normally active elements of the system 10 but instead are optional, and typically manual, expedients which can be conveniently used together to isolate the pH monitoring system 83 from the flows of irrigation water for maintenance or repair purposes, if ever needed, without discontinuing the irrigation water flow through the remainder of the system 10.

The small stream of treated irrigation water 111 that is diverted from the post-filter main line 20 at the starting end 120 of the pH feed line 88 feeds into the pH monitoring system 83 through the pH feed line 88. (The starting end 120 of the pH feed line 88 as seen in FIG. 3 and the pH feed line 88 as seen in FIG. 2 are opposite ends of a single flow line.) The pH of that small stream is read by the pH sensor 86 of the pH monitoring system 83. Electrical connections between the pH sensor 86 and the pH monitoring system 83 exist but are not shown. The pH monitoring-system pump 84 pumps the small stream through the pH monitoring system 83, and the pH monitoring-system pump 84 is controlled by the master controller 78 (electrical connections between these elements are not shown.)

To summarize, the pH monitoring system 83 includes the pH monitoring-system pump 84 which pumps treated irrigation water 111 from the post-filter main line 20 through the pH feed line 88, past the pH sensor 86, and then back to the post-filter main line 20 through the pH return line 90. The electrical connections between the pH monitoring system 83 and the pH controller 80 are not shown.

The solenoid 124 shuts off treated irrigation water 111 flow from the post-filter main line 20 through the starting end 120 of the pH feed line 88 when the water-flow pressure seen at the pre-filter main-line pressure sensor 130 and/or at the mixing-chamber feed-line flow sensor 102 drop below predetermined threshold values. The solenoid 124 is in electrical connection (not shown) with the master controller 78.

Figure 4:
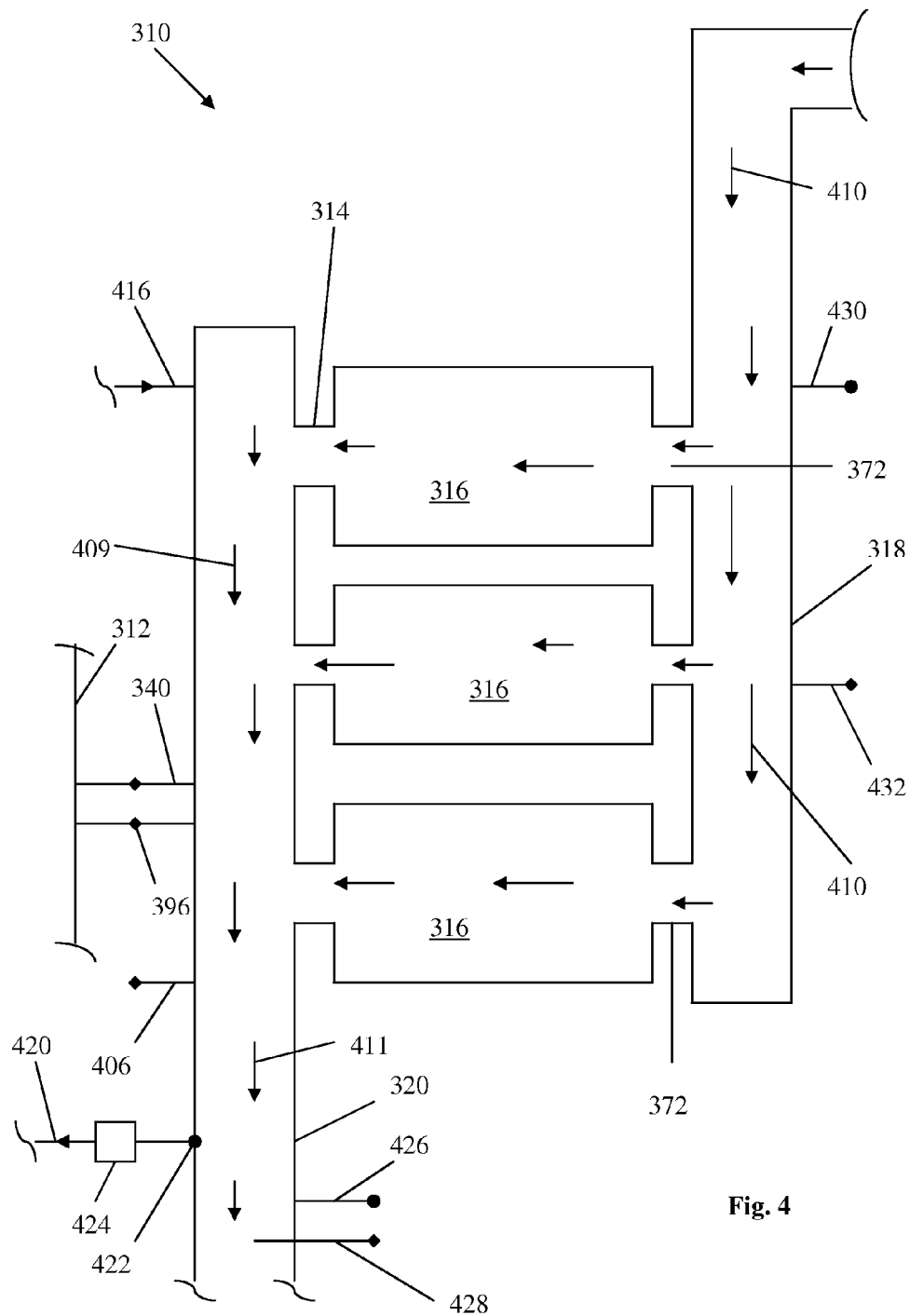
FIG. 4 is an at least partially diagrammatic view of a section of a system of the present invention.

The System of FIG. 4

Referring to FIG. 4, there is shown a segment of a system of the present invention designated by the general reference numeral 310, which differs from the system 10 of FIG. 1 to FIG. 3 by the omission of a separate mixing chamber component such as the mixing chamber 14 of the embodiment shown in FIG. 1 to FIG. 3. In the system 310 of FIG. 4, the raw material feed lines 340 feed directly into a main line (as shown, into the main line segment that is the post-filter main line 320.

The system 310 includes a control unit 312 (partially shown in FIG. 4), a plurality of filters 316, an irrigation-water line or main line (which is designated in two segments, namely a pre-filter main line 318 and a post-filter main line 320) and filters 316 along the main line between its pre-filter segment (pre-filter main line 318) and its post-filter segment (post-filter main line 320). Components of system 310 that are not shown in FIG. 4 include the components within the control unit 312, namely a lower chamber which houses a feed-line feed pump, pH monitoring-system pump, a pH sensor, a pH feed line and a pH return line, and also an upper chamber which houses a flow controller, a master controller, a pH controller and a temperature controller. Other components of system 310 that are not shown in FIG. 4 include at least one, and preferably a plurality of, storage containers (one for each of two raw materials, although this system 310 could just as well have up to five or more storage containers to hold all five basic raw materials as shown for system 10 of FIG. 1 through FIG. 3). In each instance the components of system 310 that are not shown in FIG. 4, and their electrical connections, are analogous to those described above for the system 10 shown in FIG. 1 to FIG. 3, and therefore no further description is needed here. Further, the components of system 310 that are shown in FIG. 4, and their electrical connections, also are analogous to those described above for the system 10 shown in FIG. 1 to FIG. 3, except as explicitly stated otherwise herein, and therefore little or no further description is needed here.

As mentioned above, there is a raw-material feed line 340 between each of the two raw-material tanks (not shown) and the post-filter main line 320. These raw-material feed lines 340 run through the interior of the control unit 312 and, as seen in FIG. 4, from there to the post-filter main line 320. For each of the raw materials, and raw-material feed lines 340, which for system 310 is two raw materials and two raw-material feed lines 340, there is an injection valve 396 along the raw-material feed line 340 just ahead of the point at which the feed line 340 enters, or discharges to, the post-filter main line 320.

Irrigation water flows to and through each of the filters 316 through filter feed lines 372, and discharges from each of the filters 316 to the post-filter main line 320. The raw materials also discharge to the post-filter main line 320 (via the feed lines 340) and along each of the raw material feed lines 340 upstream of the post-filter main line 320 is, as mentioned above, an injection valve 396, each of which is equipped with a backflow preventer (not shown).

In system 310, unlike the system 10 shown in FIG. 1 to FIG. 3, not only is there no separate mixing chamber component, there is no mixing-chamber feed line, no optional booster pump, no mixing-chamber feed-line flow meter, no mixing-chamber feed-line flow sensor, no mixing-chamber feed-line shut-off valve, no mixing-chamber discharge line and no mixing chamber discharge-line shut-off valve. There is a component that is the functional equivalent of the mixing-chamber discharge-line thermocouple 106, and that is a post-filter main-line thermocouple 406 that is positioned along the post-filter main line 320 downstream of the points at which the feed lines 340 discharge to the post-filter main line 320. The post-filter main-line thermocouple 406 ("thermocouple 406"), like the mixing-chamber discharge-line thermocouple 106 of system 10, tracks the dissolution exotherms by monitoring the irrigation-water temperature in the water stream in which dissolution occurs.

The pre-filter segment of the main line (pre-filter main line 318) is open to each of the filters 316 through filter feed lines 372 or openings. Untreated irrigation water, that is, irrigation water that is not yet treated by the system of the present invention, which is shown by flow arrows and is designated as untreated irrigation water 410 in FIG. 4, flows through the pre-filter main line 318 and discharges to the filters 316 through the respective filter feed lines 372. In addition, each of the filters 316 is open to, and discharges to, the post-filter main line 320 via filter discharge lines 314 or openings. The untreated irrigation water 410 thus flows through the filters 316 and thereafter receives the charge of raw materials from their feed lines 340, becoming treated irrigation water that carries or has been treated with the feedstock of the present invention. Although charging the feedstock along a post-filter section of the main line (post-filter main line 320) is preferred, charging the feedstock along a pre-filter section of the main line (pre-filter main line 318) is not excluded from the present invention. The feedstock charge should, however, be pre-delivery (upstream of the point(s) of delivering the irrigation water to the crop). Such irrigation water is shown by flow arrows and is designated as treated irrigation water 411 in FIG. 4 and elsewhere herein.

Along the post-filter main line 320, in the order of from upstream (where the stream of irrigation water has not flowed past the feed lines 340 and therefore the water is filtered but not yet irrigation water 409) to downstream (farthest along the post-filter main line 320), are a post-filter main-line pressure gauge 426 and a post-filter main-line flow sensor 428.

Along the pre-filter main line 318, in the order of from upstream (closest to the water source, not shown) to downstream, are a pre-filter main-line pressure sensor 430 and a pre-filter main-line pressure gauge 432.

The temperature controller (not shown) within the control unit 312 is in electrical connection (not shown) with the thermocouple 406 along the post-filter main line 320. (The construction and operation of these electrical connections are well within the skill of an ordinary person skilled in the art.) The raw materials from the various storage tanks (not shown) are routed through the respective raw material feed lines 340 and charged to the post-filter main line 320 as the nitrogen-nutrient feedstock of the present invention. The components of the nitrogen-nutrient feedstock intermix with each other and the relatively large stream of filtered irrigation water 409 flowing out from the filters 316. Upon such intermixing, there is an exotherm from the heat of dissolution of the various raw materials. This exotherm is the reason the temperature of the nitrogen-nutrient feedstock and irrigation water mixture is preferably monitored by the thermocouple 406 downstream of the points at which the feed lines 340 discharge the raw materials to the post-filter main line 320. If that temperature is undesirably high, for instance 40° C. or higher (higher than 39° C.), the temperature controller (not shown) sends a feedback signal to the master controller (not shown) and the master controller shuts off the feed pumps (not shown) until a safe temperature is seen at the thermocouple 406, and this off/on sequence is repeated until a safe temperature, as seen at the thermocouple 406, is maintained. The volume and flow of irrigation water 409 in the post-filter main line 320 are, however, far greater than that through the mixing chamber 14 of system 10 shown in FIG. 1 to FIG. 3, and therefore the likelihood of an excessively high temperature being seen at the thermocouple 406 approaches negligible, regardless of the concentration of raw materials which are being fed, outside of, of course, a major water-flow problem in the irrigation system itself.

The master controller (not shown) automatically turns the system 310 on. The master controller is electrically connected (not shown) to the pre-filter main-line pressure sensor 430. (The construction and operation of these electrical connections are well within the skill of an ordinary person skilled in the art.) When a minimum pressure (typically 15 psi) is seen at the pre-filter main-line pressure sensor 430, the master controller actuates the feed pumps (not shown) and injection valves 396 and any other component of the system 310 which facilitate the treatment of the irrigation water that are then in an inactive state. Upon such actuation, raw materials start feeding to the post-filter main line 320 as the nitrogen-nutrient feedstock of the present invention. The master controller will not allow such actuation unless the minimum is met. Once the feed pumps (not shown) and injection valves 396 are actuated, the master controller, for safety reasons and preferably, will automatically shut down the feed pumps and injection valves 396 when the value seen at the pre-filter main-line pressure sensor 430 falls below its minimum, and automatically restart the feed pumps and injection valves 396 when the value seen at the pre-filter main-line pressure sensor 430 meets or exceeds its respective minimum. In other words, once the flow of untreated irrigation water 410 to the fields begins, the irrigation water starts flowing (a) through the pre-filter main line 318, (b) to and through the filters 316, (c) discharging to, and flowing through the post-filter main line 320, and (d) from there to the irrigation lines in the field(s) (not shown), and when this flow starts, the master controller will actuate the feed pumps and injection valves 396 provided this irrigation water flow is at the normal, or expected, pressure, flow and flow rate. Note that generally the flow of irrigation will occur as described above regardless of whether the master controller has actuated the feed pumps and injection valves 396 or has shut down the feed pumps and injection valves 396 after initial actuation because that water flow sequence and infrastructure are the conventional elements of the irrigation system.

The starting end 420 of the optional pH feed line is downstream of the point(s) at which the raw materials are charged to the post-filter main line 320 and therefore, as in system 10 shown in FIG. 1 to FIG. 3, it is the pH of the treated irrigation water 411, not the irrigation water prior to treatment, which is being monitored by diverting a very small stream of treated irrigation water 411 through the starting end 420 of the pH feed line to the pH sensor (not shown) whereby the pH controller (not shown) adjusts (increases or decreases) the feed of acid(s) and/or base(s) to achieve a constant target treated irrigation water pH. The target treated irrigation water pH is typically a pH of about 6.5. Along the post-filter main line 320, in the order of from upstream (where the stream of irrigation water has not flowed past the feed lines 340 and therefore the water is filtered but not yet irrigation water 409) to downstream (farthest along the post-filter main line 320), are the terminal end 416 of the pH return line, the raw material feed lines 340 and the thermocouple 406 (both mentioned above), the starting end 420 of the pH feed line (along which is a pH line shut-off valve 422 and a solenoid 424), a post-filter main-line pressure gauge 426 and a post-filter main-line flow sensor 428 (both mentioned above).

Again, the remainder of the system 310 is analogous to the system 10 shown in FIG. 1 to FIG. 3 and described in detail above. Further, as described above for system 310, the "mixing chamber" concept is part of, or within, the irrigation main line, namely the post-filter section of the irrigation main line (post-filter main line 320). The dilution of the nitrogen-nutrient feedstock in this far greater water stream is of course highly increased, thereby minimizing the exotherms even more than is possible with a separate mixing chamber component such as the mixing chamber 14 of system 10. Further, system 310 is simpler than system 10 because most of the controls associated with a separate mixing chamber component such as the mixing chamber 14 of system 10 are eliminated, as described above, and even the thermocouple 406 may be an unnecessary safety component because the level of nitrogen-nutrient feedstock being charged is so extremely low in comparison to the volume of irrigation water to which it is being charged.

Example 1

Projection

The method of the present invention was evaluated for use at a very large vineyard. The grower conducted plant tissue analyses and soil analyses to determine the fertilization requirements. Based on these analyses, the nitrogen fertilization recommendation to the grower for a single crop cycle was 50 lb/acre as N.

Example 1

Irrigation Water Profiles

Irrigation water usage of (a) 1.0 ac-ft/acre during the five-month time period from February 1 through June 30; and (b) 1.0 ac-ft/acre during the three-month time period from July 1 through September 30. Irrigation water flow rate of 1,000 gal./min. Adjusted irrigation water pH of 6.5. Irrigation duration (as to nitrogen-nutrient feedstock feeding time) of six hours per irrigation period. As noted above, the acreage being irrigated is 150 acres.

Example 1

Continuous-Feeding Projections and Multivalent Ion Levels

The addition time periods, the raw materials continuously fed, and the amount and type of nitrogen nutrient fed are set forth in Table 2 below.

TABLE 2

| Time period | Raw Materials | Amount(s) of Nutrient/Additive Applied |
|---|---|---|
| 2/1-6/30 | Calcium nitrate soln. | 13.7 lbs/acre nitrate nitrogen (as N) and 19.5 lbs/acre Ca (as Ca) |
| same | Magnesium nitrate soln. | 6.9 lbs/acre nitrate nitrogen (as N) and 6.0 lbs/acre Mg (as Mg) |
| same | Urea soln. | 7.0 lbs/acre urea nitrogen (as N) |
| same | Ammonium hydroxide soln. | 8.7 lbs/acre ammoniacal nitrogen (as N) |
| same | (Sulfuric acid (conc.)) | (as required to lower the irrigation-water pH to 6.5) |
| 7/1-9-30 | Calcium nitrate soln. | 13.7 lbs/acre nitrate nitrogen (as N) and 19.5 lbs/acre Ca (as Ca) |
| same | (Sulfuric acid (conc.)) | (as required to lower the irrigation-water pH to 6.5) |

Again, as discussed above, multivalent cations and anions are the primary cause of precipitation. The continuous feeding of 19.5 lbs/acre calcium (as Ca) first over a five-month time period (2/1-6/30) and then over a three-month time period (7/1-9/30) in six-hour irrigation periods at the 1,000 gal./min. flow rate generates at most a 7.2 ppm level of $Ca^{+2}$ in the irrigation water. The continuous feeding of 6.0 lbs/acre magnesium (as Mg) over a five-month time period (2/1-6/30) in six-hour irrigation periods at the 1,000 gal./min. flow rate generates a 2.2 ppm level of $Mg^{+2}$ in the irrigation water. These levels of multivalent cations are below the levels that, in combination with the hardness and alkalinity already present in the irrigation water, cause precipitation and subsequent plugging of the irrigation system. In comparison to conventional slug feeding of conventional commercial fertilizers, there is about a 135 fold reduction of $Ca^{+2}$ and $Mg^{+2}$ concentrations in the irrigation water. These reductions were achieved while providing nitrate nitrogen (fast-release), urea nitrogen (controlled release) and ammoniacal nitrogen (slow release) in roughly equal amounts.

Example 2

Projection

The method of the present invention was evaluated for use at a 150 acre almond ranch that has been using conventional fertilization practices for years. For this evaluation, a fertigation program similar to that used in the past was selected except that the recommended nitrogen fertilizer was lowered from 200 lb/acre as N to 150 lb/acre as N because, as discussed above, a far higher percentage of the nutrients applied are available to the crop in comparison to conventional fertilization practices. The downward adjustment of the nitrogen nutrient profile for the method of the present invention is a very conservative estimate of the lower nutrient levels required when nutrients are no longer being lost to the root area as described above for conventional fertilization.

The agricultural area of this Example 2, namely the 150 acre almond ranch, will normally receive a total of four acre-feet of irrigation water over its eight-month (March 1 to October 31) growing season (crop cycle), delivered as follows: (a) 1.0 acre-foot during the first three months (March 1 through May 31); 2.5 acre-feet during the second three months (June 1 through August 31); and 0.5 acre-foot during the last two months (September 1 through October 31). An acre-foot is 325,851 gallons, and therefore 195.5 million gallons of irrigation water are delivered to the acreage of this ranch per growing season. The fertigation program required using the method of the present invention to meet the adjusted nutrient profile is shown in Table 3 below.

TABLE 3

Continuous-Feed Fertilization Schedule

| | Total Amounts Fed Over Time Periods (lb.) | | | | | | | |
|---|---|---|---|---|---|---|---|---|
| | Mar. | Apr. | May | Jun. | Jul. | Aug. | Sept. | Oct. |
| Fertilizer Solution (% N-P-K & other nutrients) | | | | | | | | |
| Calcium nitrate (8.3-0-0 + 11.8 Ca) | ← | 70.59 | → | | ← 70.59 → | | ← 70.59 → | |
| Magnesium nitrate (7.2-0-0 + 6.3 Mg) | ← | 21.11 | → | | ← 21.11 → | | ← 21.11 → | |
| Nitric acid (15.1-0-0) | ← | 116.7 | → | | ← 33.91 → | | ← 33.91 → | |
| Ammonium hydroxide (24-0-0) | ← | 104.2 | → | | ← 52.8 → | | ← 52.8 → | |
| Urea (23-0-0) | ← | 108.7 | → | | ← 54.36 → | | ← 54.35 → | |
| Nutrient (by type) | | | | | | | | |
| Nitrate nitrogen (as N) | ← | 25.00 | → | | ← 12.50 → | | ← 12.50 → | |
| Ammoniacal nitrogen (as N) | ← | 25.00 | → | | ← 12.50 → | | ← 12.50 → | |
| Urea nitrogen (as N) | ← | 25.00 | → | | ← 12.50 → | | ← 12.50 → | |

Example 2

Feed Rate (Nitrate Nitrogen)

In the continuous feeding projection of Example 2 (the normalized March 1 through May 14 feeding of 20.83 lbs./acre of nitrate nitrogen), the nitrate nitrogen is produced from three sources (again normalized): 4.88 lbs./acre of nitrate nitrogen from the calcium nitrate feedstock; 1.27 lbs./acre of nitrate nitrogen from the magnesium nitrate feedstock; and 14.68 lbs./acre of nitrate nitrogen from the nitric acid feedstock. These feedstocks have the following compositions and densities, respectively: 8.30% nitrate nitrogen and a density of 12.22 lbs./gal. for calcium nitrate; 7.30% nitrate nitrogen and a density of 11.29 lbs./gal. for magnesium nitrate; and 15.1% nitrate nitrogen and a density of 11.73 lbs./gal. for nitric acid. The volume of calcium nitrate feedstock used is 150 acres×4.88 lbs./acre NO3-(as N)×(100%/8.3%)×(1 gal./12.22 lbs.) or 723 gallons, which is charged continuously during 62.6 irrigation periods at a feed rate of (723 gal./62.6 cycles)×(1 cycle/9.0 hrs.)×(1 hr./60 min.) or 0.0214 gal./min.

The volume of magnesium nitrate feedstock used is 150 acres×1.27 lbs./acre NO3-(as N)×(100%/7.2%)×(1 gal./11.29 lbs.) or 234 gallons, which is charged continuously during 62.6 irrigation periods at a feed rate of (234 gal./62.6 cycles)×(1 cycle/9.0 hrs.)×(1 hr./60 min.) or 0.00693 gal./min.

The volume of nitric acid feedstock used is 150 acres×14.68 lbs./acre NO3-(as N)×(100%/15.1%)×(1 gal./11.73 lbs./gal.) or 1243 gallons, which is charged continuously during 62.6 irrigation periods at a feed rate of (1243 gal./62.6 cycles)×(1 cycle/9.0 hrs.)×(1 hr./60 min.) or 0.0368 gal./min.

In comparison to the above feed rates, which in combination are about 0.065 gal./min, the volume of a typical commercial fertilizer (CAN-17, an aqueous solution of calcium nitrate and ammonium nitrate which contains 11.6% nitrate nitrogen and 5.4% ammoniacal nitrogen) fed over a typical 9 hour fertilization period using the conventional fertigation method required to deliver an equivalent amount of nitrate nitrogen is more than 4 gal./min.

In addition, if after the start of the irrigation time period, the weather conditions change from those predicted or there is a change in the nutrient needs of the crops for any reasons, the fertigation of the present invention can be readily adjusted to nitrogen levels and types (i.e. urea vs. ammoniacal vs. nitrate nitrogen) appropriate for the altered needs, while no post-time-period-start adjustments can be made in a conventional slug-fed fertigation program because all of the fertilizers have been added to the soil, and the program most likely was locked into a specific pre-selected fertilizer blend in the first instance via a pre-season purchase contract.

Example 2

Acid/Base Reaction Profile

The acid and bases charged in the Example 2 projection are 116.7 lbs./acre concentrated nitric acid (572.6 moles H+/acre) and 104.2 lbs./acre of concentrated ammonium hydroxide (385.7 moles OH—/acre), and 108.7 lbs./acre of urea (399.4 moles OH—/acre). The amount of concentrated sulfuric acid required to achieve a neutral pH by offsetting the excess of alkalinity over acidity here can be readily approximated from the acidity and alkalinity contributions from these sources. This is a "rough" irrigation-water neutralization because the system of the present invention can be adapted to also automatically sense the water pH and automatically correct the water pH by a continuous acid feed at a rate to assure the desired pH is continuously maintained.

If a grower attempted to simultaneously add the equivalent amounts of ammonium hydroxide, urea, sulfuric acid and nitric acid by conventional fertigation method, an extreme exotherm would develop. This exotherm would be dangerous to both the irrigation equipment and equipment system, as well as the operator (irrigator). For this reason, the fertigation-addition of these chemicals in an agricultural environment, outside of the system and method of the present invention, would be wholly unreasonable and would not be attempted. In other words, the method and system of the present invention mitigate the conditions that generate huge exotherms by mixing these chemicals under conditions approaching infinite dilution.

Example 2

Calcium and Magnesium Levels

In the addition of calcium nitrate from March 1 through May 31 (a 1.0 ac-ft/acre water usage period), the calcium nitrate-derived calcium (as Ca) concentration in the irrigation water (8.33 lbs./acre×150 acres×1000 grams/2.2 lbs.)/(1.0 ac-ft/acre×325,851 gal./ac-ft×3780 ml/gal.×150 acres) is 3.07 ppm calcium (as Ca).

In the addition of calcium nitrate from June 1 through August 31 (a 2.5 ac-ft/acre water usage period), the calcium nitrate-derived calcium (as Ca) concentration in the irrigation water (8.33 lbs./acre×150 acres×1000 grams/2.2 lbs.)/(2.5 ac-ft/acre×325,851 gal./ac-ft×3780 ml/gal.×150 acres) is 1.23 ppm calcium (as Ca).

In the addition of magnesium nitrate from March 1 through May 31 (a 1.0 ac-ft/acre water usage period), the magnesium nitrate-derived magnesium (as Mg) concentration in the irrigation water (1.33 lbs./acre×150 acres×1000 grams/2.2 lbs.)/(1.0 ac-ft/acre×325,851 gal./ac-ft×3780 ml/gal.×150 acres) is 0.49 ppm magnesium (as Mg).

In the addition of magnesium nitrate from June 1 through August 31 (a 2.5 ac-ft/acre water usage period), the magnesium nitrate-derived magnesium (as Mg) concentration in the irrigation water (1.33 lbs./acre×150 acres×1000 grams/2.2 lbs.)/(2.5 ac-ft/acre×325,851 gal./ac-ft×3780 ml/gal.×150 acres) is 0.20 ppm magnesium (as Mg).

As indicated above, the calcium (as Ca) concentration in the irrigation water is 3.08 ppm calcium (as Ca) during the continuous fertigation process from March 1 through May 31 and is 6.13 ppm calcium (as Ca) during the continuous fertigation process from September 1 through October 31. The calcium-concentration threshold above which there is an irrigation-system plugging problem, is thirty-six times higher than the highest calcium concentration used in this projection.

Example 3

Projection

The fertigation projections for a ranch having 453 acres of almonds under cultivation were developed for the method and system of the present invention. The expected irrigation period for the crop is March 1 through October 30. The irrigation system on this ranch does not allow simultaneous irrigation of the entire 453 acres. Instead, the 453 acres are irrigated in five portions or sections, and a set of valves switches the water flow from one section to another. Fertigation of course must likewise be conducted in five portions or sets, that is, one set for each of the five sections.

The nitrogen nutrient profile (below) is satisfied with a continuous feeding of at least one, and preferably a plurality of, nitrogen-nutrient-feedstock raw materials, the constituents of which are different during three continuous-fertigation intervals (each designated by the first and last dates of the interval) wherein up to four nitrogen-nutrient feedstock raw materials are simultaneous charged at separate, but proximate, feed points along the irrigation system's main line. These nitrogen-nutrient feedstock raw materials, upon intermixing, produce the present invention's nitrogen-nutrient feedstocks. The method of the present invention provides the flexibility with limitless and continuous fertigations (for every irrigation set) and matches, without exceeding, the nutrient profiles.

Nitrogen (as N) Profile: 200 lbs./acre Total Nitrogen. The nitrogen will be obtained from calcium nitrate solution, concentrated nitric acid, ammonia and a urea solution. This is to be added continuously during the following intervals: March 1 through May 31, 125 lbs./acre of total nitrogen (as N); June 1 through August 31, 25 lbs./acre of total nitrogen (as N); and September 1 through October 30, 50 lbs./acre of total nitrogen (as N).

March 1 through May 31 Charges and Nutrients Provided: Continuous simultaneous charge of the following raw materials: 50.60 lbs./acre ammonia, 148.32 lbs./acre calcium nitrate, 194.52 lbs./acre nitric acid, 181.20 lbs./acre urea and sulfuric acid (as required to maintain a target pH of 6.5 for the treated irrigation water). This continuous charge provides 125 lbs./acre of total nitrogen (as N), equally distributed between ammoniacal (41.68 lbs./acre), nitrate (41.68 lbs./acre), and urea (41.68 lbs/acre) nitrogen.

June 1 through August 31 Charges and Nutrients Provided: Continuous simultaneous charge of the following raw materials: 10.11 lbs./acre ammonia, 55.16 lbs./acre nitric acid, 36.21 lbs./acre urea and sulfuric acid (as required to maintain a target pH of 6.5 for the treated irrigation water). This continuous charge provides 24.99 lbs./acre of total nitrogen (as N), equally distributed between ammoniacal (8.33 lbs./acre), nitrate (8.33 lbs./acre), and urea (8.33 lbs/acre) nitrogen.

September 1 through October 30 Charges and Nutrients Provided: Continuous simultaneous charge of the following raw materials: 20.22 lbs./acre ammonia, 148.30 lbs./acre calcium nitrate, 28.86 lbs./acre nitric acid, 72.42 lbs./acre urea and sulfuric acid (as required to maintain a target pH of 6.5 for the treated irrigation water). This continuous charge provides 49.98 lbs./acre of total nitrogen (as N), equally distributed between ammoniacal (16.66 lbs./acre), nitrate (16.66 lbs./acre), and urea (16.66 lbs/acre) nitrogen.

Example 4

Projection

In a situation as described above for Example 3, the same projections and profiles were set prior to the growing season, but then excessive rainfall began and continued into the growing season. Since the crop had already received an excessive amount of water, no irrigation or fertigation was done until the rainfalls ceased and the soil sufficiently dried. When irrigation and fertigation could commence, it was no longer desirable to use the slow-release forms of nitrogen, namely urea and ammoniacal nitrogen that are broken down in the soil to nitrate nitrogen. Instead, fertigation with nitrate nitrogen to provide nitrogen to the crop as quickly as possible was desired. To achieve that goal, the grower merely switched the nitrogen-nutrient feedstock from one which provided a significant proportion of slow-release forms of nitrogen to one which provided the needed nitrate nitrogen. In addition, to accommodate the reduced need for irrigation and the increased need for nitrogen that can be taken up by the plant, as a result of the heavy rainfall, the quantity (higher than the projected amount to be added by the continuous fertigation beginning March 1) of fast release nitrate nitrogen per unit time is simply and easily increased with the fertigation method of the present invention. In a similar fashion, the other forms of nitrogen (ammoniacal and urea nitrogen) are decreased or stopped. Although the irrigation time is now shorter, the increase in fast release nitrate nitrogen, when increased or adjusted in this manner, quickly alleviates any nitrogen deficiency caused by the unexpected rainfall. This example demonstrates the versatility of the present invention which rapidly corrects for any nitrogen nutrient deficiency by instantly changing the raw material profile with no adverse impact on the crop or the grower. Similarly, if a grower elects to initially use the nitrogen addition level that was previously used with the grower's former conventional slug feeding fertigation method, the efficiency of nitrogen uptake provided by the present invention is expected to necessitate a curtailment of nitrogen fertilization during the crop cycle. In such circumstances, the prolonged term will be less than the entire crop cycle.

The present invention in some embodiments is a system for prolonged-termed continuous fertigation of an agricultural field under the irrigation of an active agricultural irrigation system. Such prolonged-termed continuous fertigation includes charging a nitrogen-nutrient feedstock to the active agricultural irrigation system, wherein the active agricultural irrigation system has flowing irrigation water upstream of the agricultural field. The nitrogen-nutrient feedstock is comprised of at least one, and preferably a plurality of, nitrogen-nutrient-feedstock raw materials (which are also referred to herein as nitrogen-nutrient raw materials and raw materials), and such nitrogen-nutrient-feedstock raw materials generate an exotherm upon intermixing with each other and/or with the irrigation water.

The system for prolonged-termed continuous fertigation has at least one, and preferably a plurality of, nitrogen-nutrient raw-material feed points open to a stream of flowing irrigation water. The feed points are sufficiently proximate each other and the stream of the irrigation water has sufficient flow to intermix the plurality of nitrogen-nutrient-feedstock raw materials with each other and with the stream of flowing irrigation water. The feed points are each preferably spaced-apart from the neighboring feed point(s) a distance of no more than about 10 inches, and more preferably no more than about 8 inches because, in preferred embodiments, the pH of the post-feed (treated) irrigation water is monitored upstream of the agricultural field. The length of the mainline along which such pH monitoring occurs might be twenty to thirty feet, or it might be only a few feet. In the former instances, closely proximate feed points and the positioning of the feed points well upstream of the pH monitoring point allows a good intermixing of the nitrogen-nutrient-feedstock raw materials ahead of the pH monitoring point. In the latter instances, closely proximate feed points positioned as far upstream of the pH monitoring point as practically possible are needed to provide a reasonable degree of intermixing of the nitrogen-nutrient-feedstock raw materials ahead of the monitoring point.

The stream of irrigation water also has a sufficient flow to dampen the dissolution exotherm. In an irrigation system, the ambient temperature of the irrigation water depends on a number of factors, including the time of year (which impacts ambient outdoors air temperature) and the ambient temperature of the water source (which varies from very cold water, such as snow run-off, to rather warm water, such as well water in geothermal areas) and it can range from 35 to 100 degrees F. An excessive, and in instances dangerous, increase in water temperature would ensue if the irrigation water were static or had an insufficient flow to dampen the exotherms. A sufficient flow is difficult to adequately describe in terms of flow rates because main-line diameters and other factors differ drastically from one irrigation system to another. Therefore the sufficiency of flow is better described in terms of its ability to dissipate the heat of the exotherms, which in turn is measurable by the increase, if any, in the ambient water temperature of the irrigation water. In the present invention generally, an increase in temperature over ambient water temperature (which again can be very cold to rather warm) is no more than about 60 degrees F. and is dependent on the raw materials being fed, and rate at which they are being fed, and individual characteristics of the irrigation system being served. In preferred embodiments the dissolution exotherms are dampened to the extent that a temperature increase is no more than 40 degrees F. over ambient irrigation water temperature, and more preferably no more than 20 degrees F. over ambient irrigation water temperature.

When one or a plurality of nitrogen-nutrient-feedstock raw materials are being fed, the system of the present invention has means for feeding one of, or separately and simultaneously feeding a plurality of, the nitrogen-nutrient-feedstock raw materials to the stream of flowing irrigation water whereby treated irrigation water is formed. As described above for the systems shown in FIG. 1 to FIG. 4, such means can include feed lines, each running from a supply of a nitrogen-nutrient feedstock raw material to a feed point, and the various controls described for activating and maintaining the simultaneous feeding of nitrogen-nutrient-feedstock raw materials to the stream of flowing irrigation water. Upon the feeding of one or more the nitrogen-nutrient-feedstock raw materials to the stream of flowing irrigation water, they intermix with each other (when there are more than one) and intermix with the irrigation water, and convert the irrigation water to treated irrigation water (the irrigation water now being a vehicle carrying the nitrogen nutrient (s) to the agricultural field).

The irrigation system includes means for irrigating the agricultural field with the treated irrigation water, which means are the transport pipe lines and micro-irrigation type of emitters or the like, or overhead sprinkling systems.

The single or plurality of nitrogen-nutrient raw-material feed points preferably open to a high-dilution environment and therefore the nitrogen-nutrient-feedstock raw material(s) are fed to a high-dilution environment. Feeding to such a high-dilution environment is preferred because a greater dampening of exotherms will be realized. Embodiments of the system of the present invention in which the nitrogen-nutrient-feedstock raw material(s) are fed to a high-dilution environment include feeding to the stream of flowing irrigation water flowing through the main line of an irrigation system at a section upstream of the agricultural field, and in such embodiments the plurality of feed points are disposed along the main line. Embodiments of the system of the present invention in which the nitrogen-nutrient-feedstock raw material(s) are fed to a high-dilution environment also include feeding to a stream of irrigation water flowing through a side-arm mixing chamber (which discharges to the main line) and then the one or plurality of feed point(s) are disposed along the side-arm mixing chamber. In the latter instance, the fast flow and discharge to the main line are a sufficiently high-dilution environment to dampen exotherms although monitoring the water temperature in this region is prudent while monitoring water temperature in the former embodiments can be necessary.

In preferred embodiments, the system of the present invention includes means to commence the feed of the nitrogen-nutrient-feedstock raw material(s) upon the water stream reaching a first pre-selected degree of flow, means to halt the feed upon the stream reaching a second pre-selected degree of flow, and means to separately provide a pre-selected degree of feed through the feed point or each of the plurality of feed points, such as the components described above for the systems shown in FIG. 1 through FIG. 4.

In preferred embodiments, the system of the present invention includes means to determine the pH of the treated irrigation water upstream of the agricultural field, such as the components described above for the systems shown in FIG. 1 through FIG. 4. The point for determining the pH of the treated irrigation water is of course downstream of the feed points because irrigation water is converted to treated irrigation water only upon receiving the raw materials. Preferably the pH of the treated irrigation water has sufficient time to stabilize prior to being monitored and therefore the monitoring of the pH, or the sampling for the pH monitoring, is as far downstream of the feed points as practicalities permit. For this same reason, namely to space apart the feed point(s) and pH monitoring point, the feed point (when there are a plurality of feed points) are preferably close to each other, for instance no more than about ten inches apart from adjacent feed points. A distance between adjacent feed points of from about six to about eight inches is very practical. When the length of main line available is short, for instance only about three feet, the feed point(s) are preferably placed as far upstream as possible and the pH monitoring point is placed as far downstream as practical so as to leave the longest stretch of line between them as is practical. When the length of available main line is longer, for instance bout thirty-five feet, it is still desirable to place the feed point(s) well upstream and the pH monitoring point well downstream for optimal pH stabilization.

The method of the present invention preferably uses the system of the present invention. The method of the present invention is a method of prolonged-termed continuous fertigation of an agricultural field. This method is practiced or implemented only for an active irrigation system having flowing irrigation water upstream of the agricultural field. In broad embodiments of the present invention, the method comprises the steps of: (step 1) continuous charging a nitrogen-nutrient feedstock comprised of one or a plurality of nitrogen-nutrient-feedstock raw material(s) to the active agricultural irrigation system by sub-steps 1a and 1b of: (sub-step 1a) continuously charging a first nitrogen-nutrient-feedstock raw material to a stream of flowing irrigation water upstream of the agricultural field at a first feed point; and in certain preferred embodiments, (sub-step 1b) simultaneously charging a second nitrogen-nutrient-feedstock raw material to the stream of flowing irrigation water at a second feed point. The first and (when present) second nitrogen-nutrient-feedstock raw material(s) are selected from the group consisting of calcium nitrate, magnesium nitrate, nitric acid, urea and ammonium hydroxide (ammonia). The first and second feed points are sufficiently proximate each other and the stream of flowing irrigation water has sufficient flow to intermix the first, or the first and the second nitrogen-nutrient-feedstock raw materials (when a plurality, with each other and) with the irrigation water, generating at least one dissolution exotherm. The stream of flowing irrigation water has sufficient flow to dampen the dissolution exotherm(s). The irrigation water is converted to treated irrigation water. Then (step 2) the agricultural field is irrigated with the treated irrigation water. In preferred embodiments, the flow of the stream of flowing irrigation water is sufficient to dampen the dissolution exotherms to a maximum temperature increase of 40 degrees F. over ambient irrigation water temperature, and more preferably 20 degrees F. over ambient irrigation water temperature. In various preferred embodiments the method includes, in sub-steps 1a and 1b, charging of the, or the first and second, nitrogen-nutrient-feedstock raw material(s) to a high-dilution environment, such as charging of the, or the first and second, nitrogen-nutrient-feedstock raw material(s) to the main line and charging to a side-arm mixing chamber that discharges to the main line. Step 3 is to repeat step 1 and step 2 during each fertigation day for a prolonged term.

In preferred embodiments of the method of the present invention, the nitrogen-nutrient-feedstock raw materials are selected from the group consisting of nitric acid as a 50-68 wt. percent aqueous solution, urea as a 40 to 50 wt. percent aqueous solution and ammonium hydroxide either as a 20 to 29 wt. percent aqueous solution or as a 95 to 100 wt. percent ammonia gas dissolved in water on-site.

In other preferred embodiments, the method includes, in step 1, the sub-step 1c of: (sub-step 1c) simultaneously charging a third nitrogen-nutrient-feedstock raw material with the first and the second nitrogen-nutrient-feedstock raw materials to the stream of the irrigation water at a third feed point, wherein the first, second and third feed points are sufficiently proximate each other and wherein the stream of the irrigation water has sufficient flow to intermix the first, second and third nitrogen-nutrient-feedstock raw materials with each other and with the irrigation water, generating at least one dissolution exotherm.

In other preferred embodiments, the method further includes the steps of selecting a target pH, determining the pH of the treated irrigation water, and charging an acid to the stream of flowing irrigation water in an amount sufficient to adjust the pH of the treated irrigation water to a target pH.

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

We claim:

1. A method of prolonged-termed continuous fertigation of an agricultural field during a crop cycle, said agricultural field being irrigated by means of an active irrigation system having flowing irrigation water upstream of said agricultural field, said method comprising the steps of:
  (step 1) continuously charging a nitrogen-nutrient feedstock comprised of a first nitrogen-nutrient-feedstock raw material to said active agricultural irrigation system by sub-step 1a of:
  (sub-step 1a) continuously charging said nitrogen-nutrient feedstock to a stream of said flowing irrigation water upstream of said agricultural field, wherein said nitrogen-nutrient-feedstock raw material is selected from the group consisting of fast-release-nitrogen-source nitric acid, slow-release-nitrogen-source urea, fast-release-nitrogen-source calcium nitrate, fast-release-nitrogen-source magnesium nitrate and slow-release-nitrogen-source ammonium hydroxide,
  wherein said stream of flowing irrigation water has sufficient flow to intermix said nitrogen-nutrient feedstock with said irrigation water, generating a dissolution exotherm,
  wherein said nitrogen-nutrient feedstock is charged at levels within the system solubility limits and
  wherein said stream of flowing irrigation water has sufficient flow to dampen said dissolution exotherm,
  whereby said irrigation water is converted to treated irrigation water;
  (step 2) irrigating said agricultural field with said treated irrigation water;
  (step 3) repeating step 1 and step 2 each irrigation day over a prolonged term; and
  (step 4) changing the nitrogen-nutrient feedstock by changing the balance between slow-release-nitrogen-source raw material and fast-release-nitrogen-source raw material during said prolonged term.

2. The method of prolonged-termed continuous fertigation of an agricultural field according to claim 1 wherein said flow of said stream of flowing irrigation water is sufficient to dampen said dissolution exotherm to a maximum temperature increase of 40 degrees F. over ambient irrigation water temperature.

3. The method of prolonged-termed continuous fertigation of an agricultural field according to claim 1 wherein said flow of said stream of flowing irrigation water is sufficient to dampen said dissolution exotherm to a maximum temperature increase of 20 degrees F. over ambient irrigation water temperature.

4. The method of prolonged-termed continuous fertigation of an agricultural field according to claim 1 wherein said prolonged term is an entire crop cycle.

5. A method of prolonged-termed continuous fertigation of an agricultural field under the irrigation of an active agricultural irrigation system during a crop cycle, including feeding a nitrogen-nutrient feedstock comprised of a plurality of nitrogen-nutrient-feedstock raw materials to said active agricultural irrigation system, using a fertigation system, said active agricultural irrigation system having flowing irrigation water upstream of said agricultural field, said fertigation system having a plurality of nitrogen-nutrient raw-material feed points opening to a stream of said flowing irrigation water, wherein said plurality of feed points are sufficiently proximate each other and wherein said stream of said irrigation water has sufficient flow to intermix said plurality of nitrogen-nutrient-feedstock raw materials with each other and with said stream of said flowing irrigation water, generating at least one dissolution exotherm, and wherein said stream of flowing irrigation water has sufficient flow to dampen said dissolution exotherm, and means for separately and simultaneously feeding said plurality of nitrogen-nutrient-feedstock raw materials through said feed points to said stream of said flowing irrigation water whereby treated irrigation water is formed, wherein said agricultural irrigation system includes means for irrigating said agricultural field with said treated irrigation water, said method comprising the steps of:
  (step 1) continuously and simultaneously feeding said plurality of nitrogen-nutrient-feedstock raw materials through said feed points to said stream of flowing irrigation water at levels within the system solubility limits, whereby said irrigation water is converted to treated irrigation water,
  wherein said plurality of nitrogen-nutrient-feedstock raw materials are selected from the group consisting of fast-release-nitrogen-source nitric acid, slow-release-nitrogen-source urea, fast-release-nitrogen-source calcium nitrate, fast-release-nitrogen-source magnesium nitrate and slow-release-nitrogen-source ammonium hydroxide;
  (step 2) irrigating said agricultural field with said treated irrigation water;
  (step 3) repeating step 1 and step 2 each irrigation day over a prolonged term; and
  (step 4) changing the nitrogen-nutrient feedstock by changing the balance between slow-release-nitrogen-source raw material and fast-release-nitrogen-source raw material during said prolonged term.

6. The method of prolonged-termed continuous fertigation of an agricultural field according to claim 5 wherein said prolonged term is at least ten percent of said crop cycle.

7. The method of prolonged-termed continuous fertigation of an agricultural field according to claim 5 wherein said active agricultural irrigation system includes a main line, said stream of said flowing irrigation water is flowing through said main line upstream of said agricultural field, said plurality of feed points are disposed along said main line, and wherein, in said step 1, said continuously and simultaneously feeding said plurality of nitrogen-nutrient-feedstock raw materials to said stream of flowing irrigation water is simultaneously feeding to said main line.

8. The method of prolonged-termed continuous fertigation of an agricultural field according to claim 6 wherein said active agricultural irrigation system includes a main line and a side-arm mixing chamber off said main line, and said stream of flowing irrigation water is flowing through said side-arm mixing chamber and discharging to said main line, said plurality of feed points are disposed along said side-arm mixing chamber, and wherein, in said step 1, said continuously and simultaneously feeding said plurality of nitrogen-nutrient-feedstock raw materials to said stream of flowing irrigation water is simultaneously feeding to said side-arm mixing chamber.

9. The method of prolonged-termed continuous fertigation of an agricultural field according to claim 6 further including the steps of determining and adjusting the pH of said treated irrigation water upstream of said agricultural field.

10. The method of prolonged-termed continuous fertigation of an agricultural field according to claim 6, wherein said plurality of nitrogen-nutrient-feedstock raw materials include a nitrogen-nutrient-feedstock raw material selected from the group consisting of fast-release-nitrogen-source nitric acid in an aqueous solution containing from 50 to 68 wt. percent nitric acid, slow-release-nitrogen-source urea as a 40 to 50 wt. percent aqueous solution and slow-release-nitrogen-source ammonium hydroxide selected from the group consisting of a 20 to 29 wt. percent aqueous solution and ammonia gas.

11. The method of prolonged-termed continuous fertigation of an agricultural field according to claim 6 wherein said flow of said stream of flowing irrigation water is sufficient to dampen said dissolution exotherm to a maximum temperature increase of 40 degrees F. over ambient irrigation water temperature.

12. The method of prolonged-termed continuous fertigation of an agricultural field according to claim 6 wherein said flow of said stream of flowing irrigation water is sufficient to dampen said dissolution exotherm to a maximum temperature increase of 20 degrees F. over ambient irrigation water temperature.

13. The method of prolonged-termed continuous fertigation of an agricultural field according to claim 5 wherein said prolonged term is an entire crop cycle.

* * * * *